(12) United States Patent
Tomioka

(10) Patent No.: US 8,894,214 B2
(45) Date of Patent: Nov. 25, 2014

(54) IMAGE PROJECTION APPARATUS

(71) Applicant: Masatsugu Tomioka, Osaka (JP)

(72) Inventor: Masatsugu Tomioka, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 123 days.

(21) Appl. No.: 13/747,285

(22) Filed: Jan. 22, 2013

(65) Prior Publication Data

US 2013/0188154 A1    Jul. 25, 2013

(30) Foreign Application Priority Data

Jan. 19, 2012  (JP) .................................. 2012-008850

(51) Int. Cl.
| | |
|---|---|
| *G03B 21/14* | (2006.01) |
| *G03B 21/00* | (2006.01) |
| *G03B 33/12* | (2006.01) |
| *H04N 9/31* | (2006.01) |
| *G02B 26/08* | (2006.01) |
| *G03B 21/20* | (2006.01) |

(52) U.S. Cl.
CPC .............. *G03B 21/008* (2013.01); *G03B 33/12* (2013.01); *H04N 9/3105* (2013.01); *G03B 21/2066* (2013.01); *G03B 21/2033* (2013.01); *G02B 26/0833* (2013.01); *G03B 21/208* (2013.01); *H04N 9/315* (2013.01)
USPC ................................ 353/31; 348/771; 353/81

(58) Field of Classification Search
USPC .......... 353/31, 33, 34, 37, 69, 81; 349/5, 7, 8, 349/9; 348/742, 743, 771
See application file for complete search history.

(56) References Cited

U.S. PATENT DOCUMENTS

| | | | |
|---|---|---|---|
| 6,758,565 B1 * | 7/2004 | Cobb et al. ....................... 353/34 |
| 2003/0202159 A1 * | 10/2003 | Cobb et al. ....................... 353/31 |
| 2005/0007503 A1 * | 1/2005 | Iwai et al. ........................ 349/5 |
| 2005/0057729 A1 * | 3/2005 | Huang .............................. 353/33 |
| 2006/0187414 A1 * | 8/2006 | Bell et al. ........................ 353/31 |
| 2008/0158515 A1 * | 7/2008 | Candry et al. .................. 353/31 |

FOREIGN PATENT DOCUMENTS

JP        2010-44272        2/2010

* cited by examiner

*Primary Examiner* — William C Dowling
(74) *Attorney, Agent, or Firm* — Cozen O'Connor

(57) ABSTRACT

An image projection apparatus has a corrector that corrects angle distribution of illumination light such that, let, in a comparison in traveling direction between, of diffracted light resulting from light rays with the wavelengths λ1 and λ2 along the illumination optical axis being diffracted on an on-state digital micromirror device, λ1 diffracted light traveling in a direction closest to a traveling direction of the mirror-reflected light and λ2 diffracted light traveling in a direction closest to the traveling direction of the mirror-reflected light, the λ1 diffracted light be diffracted to a position farther away from the mirror-reflected light than the λ2 diffracted light, the angle distribution of the illumination light includes at least an angle distribution that fulfills conditional formula (1): Fλ2<Fλ1, where Fλ1 and Fλ2 represent F-numbers of illumination light with the first and second wavelengths λ1 and λ2, respectively.

14 Claims, 16 Drawing Sheets

IMAGE PROJECTION APPARATUS

This application is based on Japanese Patent Application No. 2012-008850 filed on Jan. 19, 2012, the contents of which are hereby incorporated by reference.

BACKGROUND OF THE INVENTION

1. Field of the Invention

The present invention relates to an image projection apparatus, and more specifically to a color image projection apparatus provided with a digital micromirror device as a display device and, for example, a laser light source as a light source for illuminating its image display surface.

2. Description of Related Art

As display devices for use in image projection apparatuses, there are known digital micromirror devices. A digital micromirror device has an image display surface composed of a plurality of minute mirrors; it controls the inclination of the individual mirror surfaces on the image display surface, thereby modulates the intensity of illumination light, and thereby forms an image. In a digital micromirror device, the turning on and off of each pixel is achieved, for example, by the rotation of a mirror surface through ±12° about a rotation axis at 45° to each side of the image display surface.

In recent years, digital micromirror devices with increasingly high definition have been developed to meet the needs for high-definition image projection apparatuses. As digital micromirror devices are given increasingly high definition, they come to have increasingly small pixel pitches, and this makes the influence of diffraction accordingly less negligible. Specifically, the smaller the pixel pitch is, the more a digital micromirror device acts as a diffraction grating, and, since incident light rays having different wavelengths have different diffraction angles, this results in uneven color in an image projected on a screen by using an image projection apparatus. The influence is particularly great in cases where a laser light source is used.

As one technology for reducing the influence of diffraction in digital micromirror devices, Patent Literature 1 listed below proposes a laser irradiation apparatus for laser machining. In this laser irradiation apparatus, to prevent lowered light transfer efficiency ascribable to diffraction, the image display surface of a digital micromirror device is inclined at a predetermined angle to the optical axis of an objective lens. Here, combining a diffraction angle with a geometric reflection angle makes it possible to reduce the influence of diffraction.

Patent Literature 1: JP-A-2010-44272

Unfortunately, however, it is difficult to apply the technology proposed in Patent Literature 1 to image projection apparatus. This is because, in an image projection apparatus, where proper imaging is expected over the entire screen, the quality of projected images will be degraded if the digital micromirror device is inclined at an angle large enough to reduce the influence of diffraction. For this reason, no image projection apparatus have thus far been proposed in which consideration is given to the influence of diffraction at a digital micromirror device.

SUMMARY OF THE INVENTION

The present invention has been devised in view of the above-described circumstances, and aims to provide an image projection apparatus where the influence of diffraction at a digital micromirror device is reduced and that produces a high-quality projection image with less unevenness in color.

According to the present invention, an image projection apparatus comprises a light source apparatus which emits illumination light, a digital micromirror device which modulates illumination light on an image display surface according to an image signal, a projection optical system which projects, while enlarging, an image with modulated light, and a corrector which, let a first wavelength and a second wavelength of wavelengths of light included in the illumination light be denoted by λ1 and λ2, respectively, the first and second wavelengths λ1 and λ2 belonging to wavelength bands of colors different from each other, let a mirror surface forming each pixel on the image display surface be referred to as a pixel surface, let reflected light produced as a result of a light ray along an illumination optical axis being mirror-reflected on the pixel surface be referred to as mirror-reflected light, let, in a comparison in traveling direction between, of diffracted light produced as a result of light rays with the wavelengths λ1 and λ2 along the illumination optical axis being diffracted on the digital micromirror device in an on state, diffracted light with the wavelength λ1 that travels in a direction closest to a traveling direction of the mirror-reflected light and diffracted light with the wavelength λ2 that travels in a direction closest to the traveling direction of the mirror-reflected light, the diffracted light with the wavelength λ1 be diffracted to a position farther away from the mirror-reflected light than the diffracted light with the wavelength λ2, corrects angle distribution of the illumination light such that the angle distribution of the illumination light includes at least an angle distribution that fulfills conditional formula (1) below:

$$Fλ2 < Fλ1 \quad (1)$$

where Fλ1 represents an F-number of illumination light with the first wavelength λ1, and Fλ2 represents an F-number of illumination light with the second wavelength λ2.

DETAILED DESCRIPTION OF THE PREFERRED EMBODIMENTS

Embodiments and examples of an image projection apparatus according to the present invention will be described below with reference to the accompanying drawings. Among different embodiments and examples, the same or equivalent parts are identified by the same reference signs, and no overlapping description will be repeated unless necessary.

How Diffraction Occurs in a Digital Micromirror Device

Figure 1A:
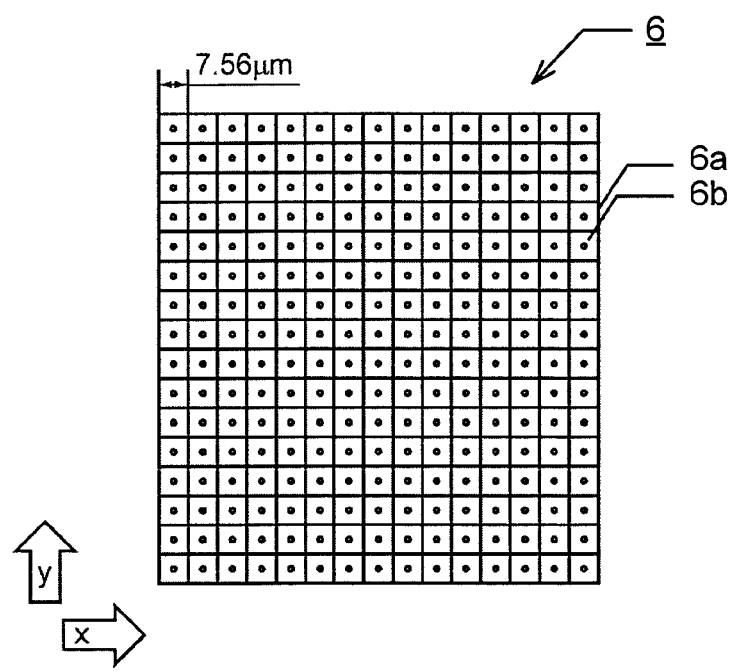
FIGS. 1A and 1B are diagrams showing the image display surface of a digital micromirror device and the diffraction pattern produced thereby.
Figure 1B:
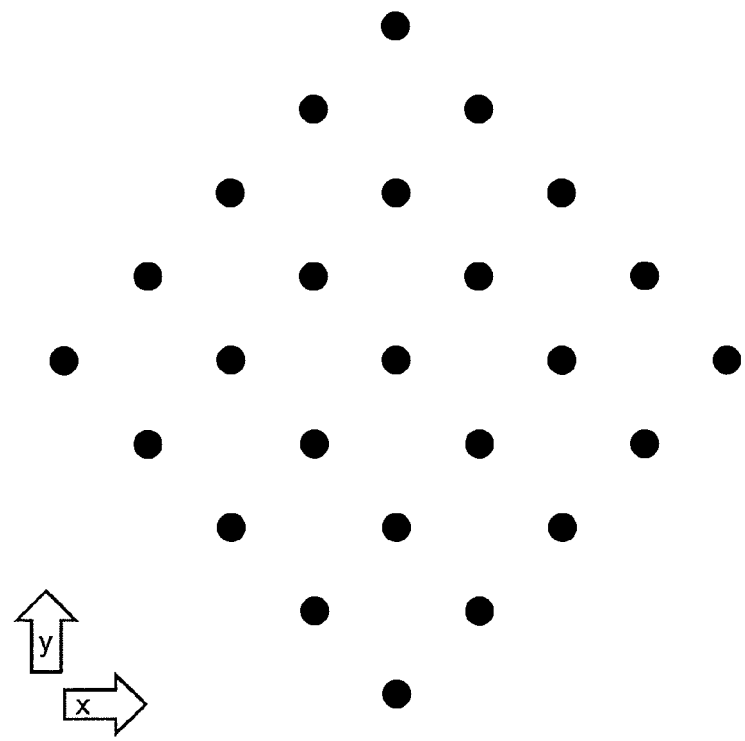

As shown in FIG. 1A, a digital micromirror device 6 has, on its image display surface 6a, pixel surfaces 6b which are mirror surfaces that respectively form pixels. Each pixel surface 6b is square in shape, has a rotation axis diagonally, and rotates through ±12° to display on and off (switch between on and off states). Illumination light is incident on the image display surface 6a from an oblique, 45°, direction that is perpendicular to the rotation axis (that is, from a direction at 45° to each side of the rectangular image display area formed by the image display surface 6a). Here, the digital micromirror device 6 acts as a diffraction grating and forms a diffraction pattern by diffraction-reflection as shown in FIG. 1B. That is, it produces diffracted light of different orders in the directions in which the pixels are arrayed, namely, in the left/right and up/down directions (x-y directions).

Figure 2:
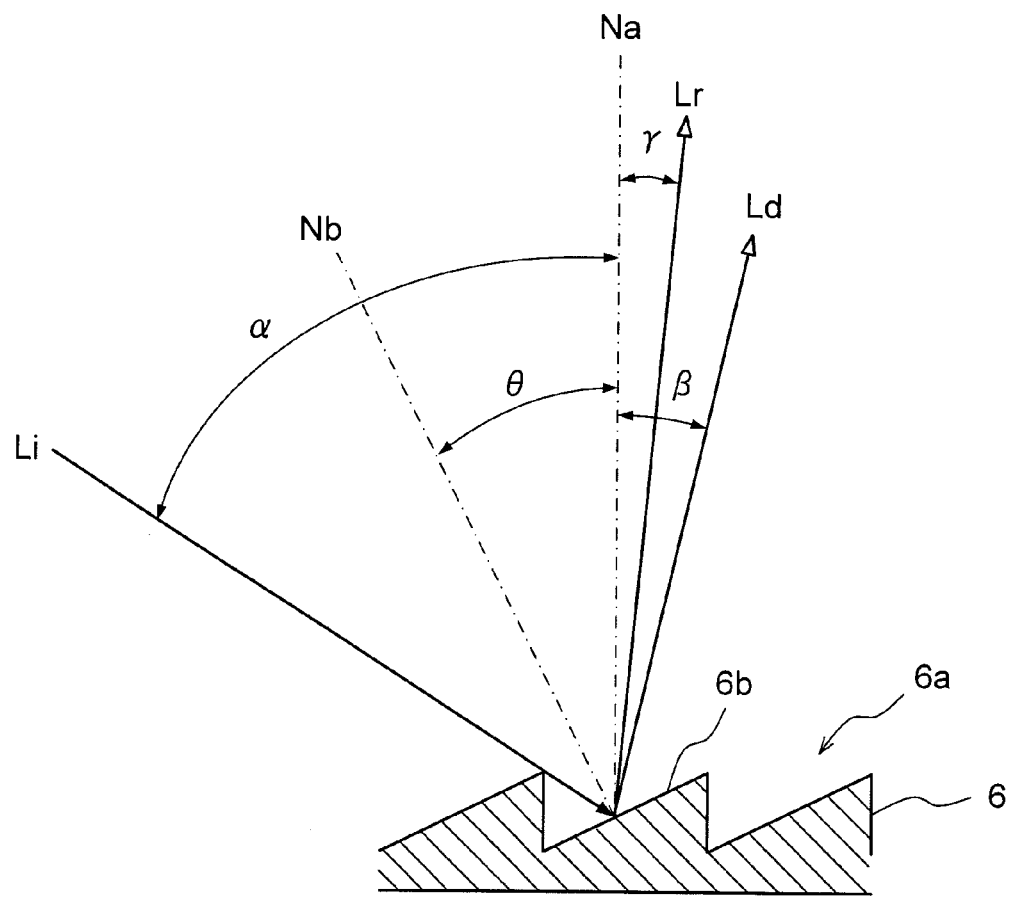
FIG. 2 is a sectional view schematically showing illumination light, mirror-reflected light, and diffracted light as observed when a digital micromirror device is regarded as a blazed diffraction grating.

The digital micromirror device 6, when seen from the direction of the rotation axis of the pixel surfaces 6b (that is, when seen on a sectional plane perpendicular to the rotation axis), can be regarded as a blazed diffraction grating as shown in FIG. 2. Here, when the incidence angle of the illumination light Li with respect to the image display surface 6a of the digital micromirror device 6 (Na representing the normal line to the image display surface 6a) is represented by α, and the inclination angle of the pixel surfaces 6b of the digital micromirror device 6 (Nb representing the normal line to the pixel surfaces 6b) is represented by θ, then the mirror-reflection angle γ of the mirror-reflected light Lr is given by the formula γ=α−2·θ. Moreover, when the pixel pitch (in the x-y directions) is represented by d, the wavelength is represented by λ, and the order of diffraction is represented by m, then the diffraction angle β of the diffracted light Ld is given by the formula $\beta = \sin^{-1}\{m \cdot \lambda/(\sqrt{2} \cdot d) - \sin\alpha\}$.

Figure 3A:
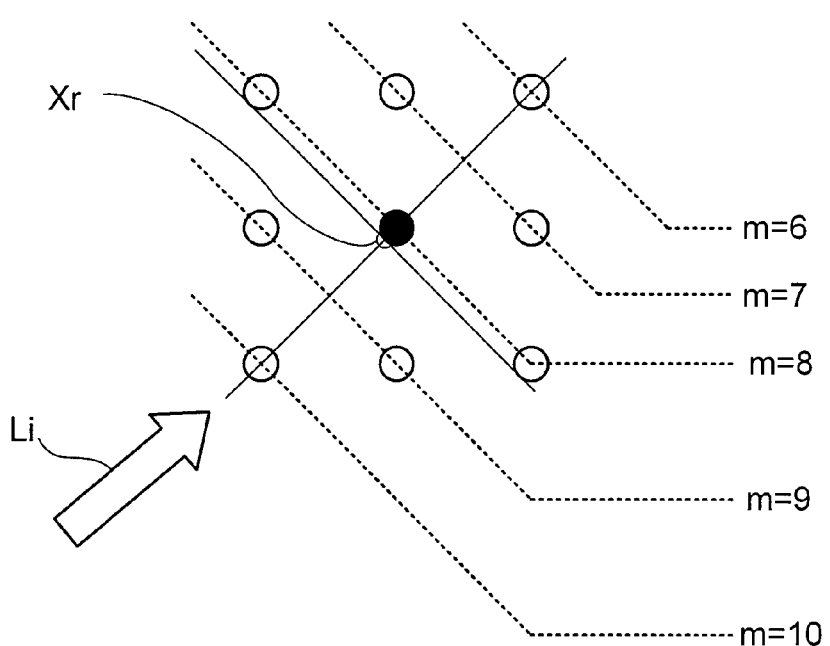
FIGS. 3A and 3B are diagrams showing the distribution of diffracted light of different orders when illumination light has a wavelength of 532 nm.
Figure 3B:
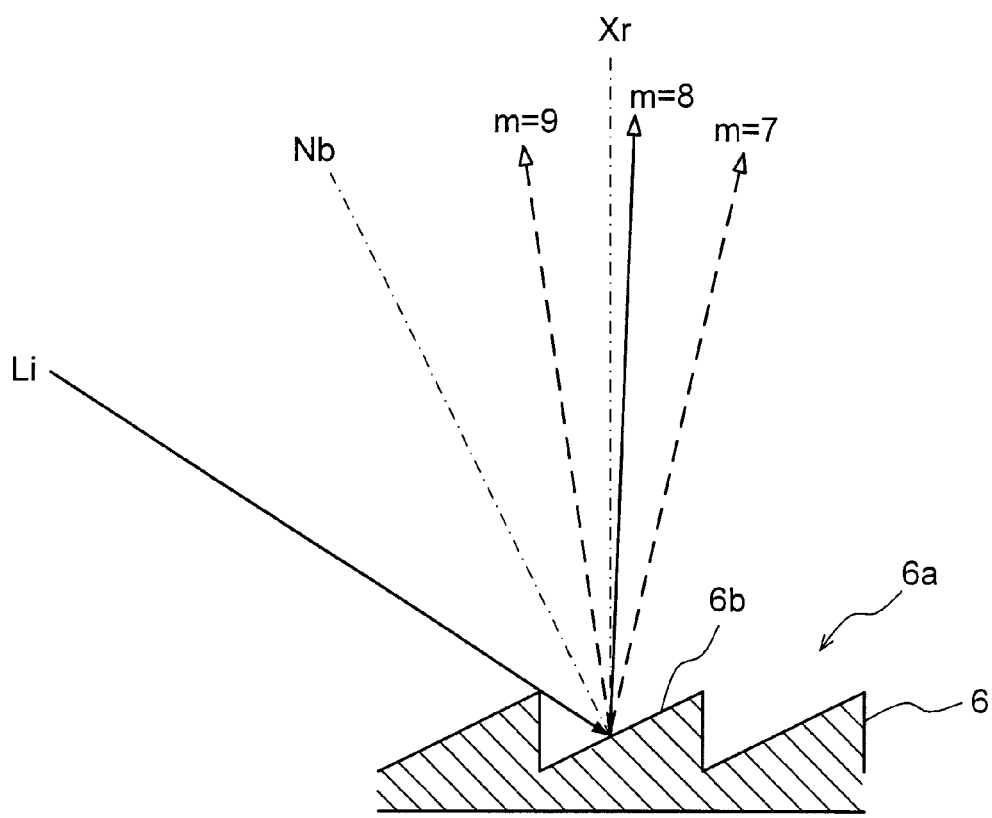

Here, the distribution of different orders of diffraction m and the diffracted light Ld (FIG. 2) in the incidence direction of the illumination light Li (that is, a direction diagonal with respect to pixels) is as shown in FIGS. 3A and 3B. FIG. 3A shows how diffraction occurs with the digital micromirror device 6 seen from in front, and FIG. 3B shows how diffraction occurs with the digital micromirror device 6 seen on a sectional plane perpendicular to the rotation axis of the pixel surfaces 6b.

FIGS. 3A and 3B show how diffraction occurs in a case where the pixel pitch d=7.56 μm, the pixel inclination angle θ=12° (ON state), the illumination light Li incidence angle α=24°, and the wavelength λ=532 nm. In this case, the diffracted optical axis of an even-numbered order (namely, the diffracted light of order 8 (m=8)) is very close to the mirror-reflected optical axis Xr, the difference being about 0.5°. The diffracted light of order 8 is reflected approximately in the mirror-reflection direction, and 95% or more of energy concentrates on the diffracted light (indicated by solid dots) closest to the mirror-reflected optical axis Xr. The light beams of other orders of diffraction have almost no energy, and is reflected without being much influenced by diffraction.

Figure 4A:
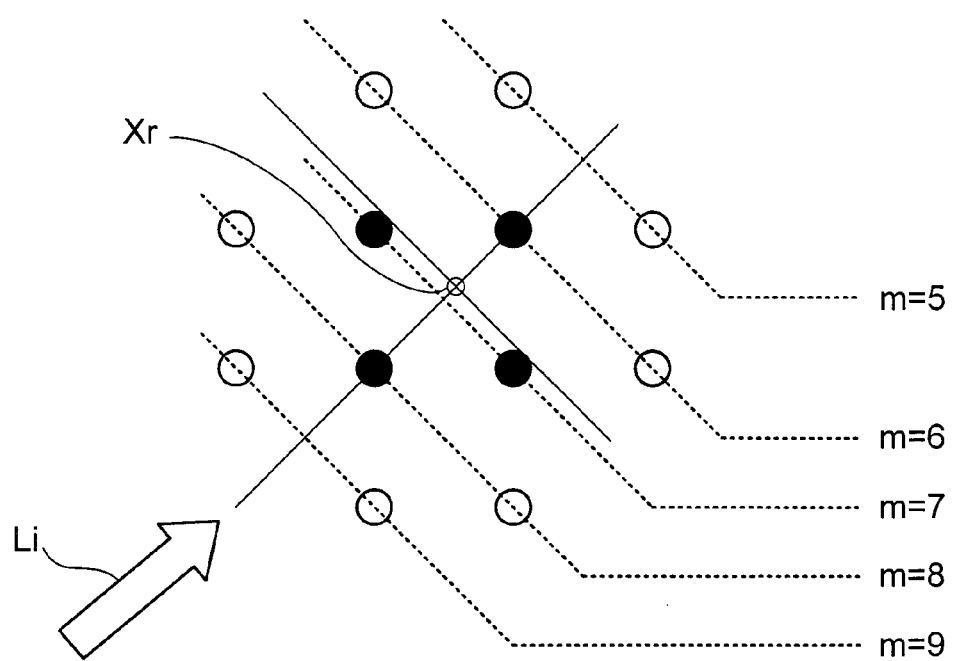
FIGS. 4A and 4B are diagrams showing the distribution of diffracted light of different orders when illumination light has a wavelength of 635 nm.
Figure 4B:
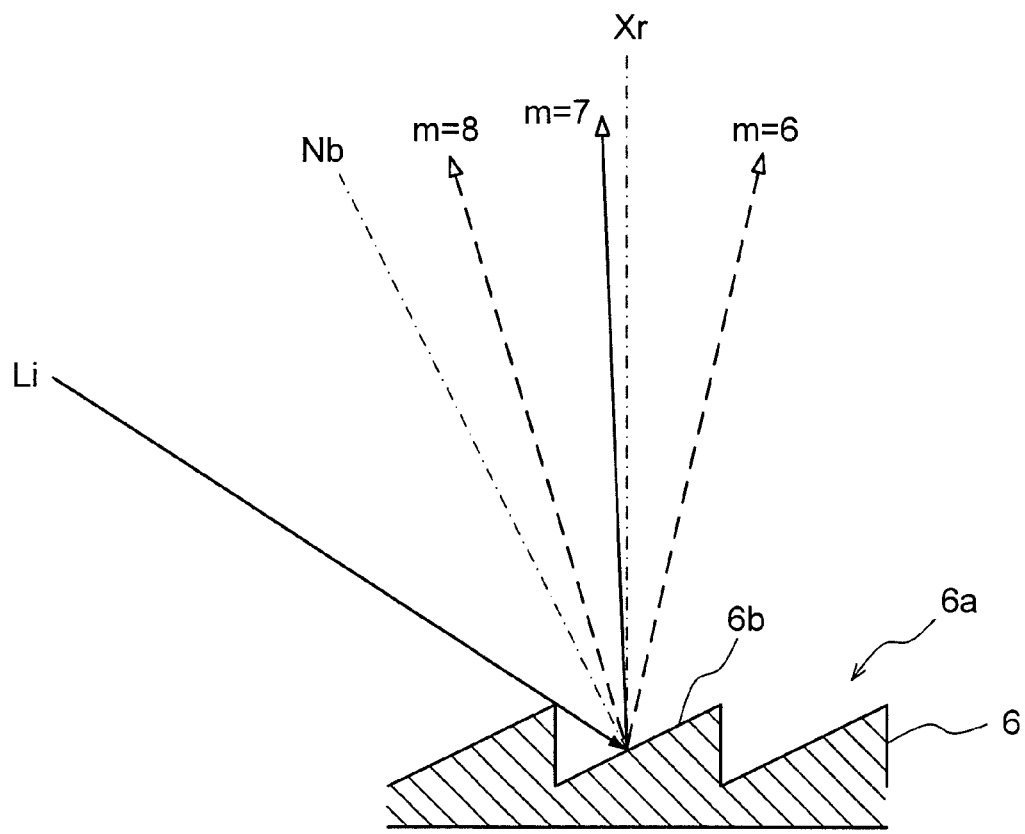

FIGS. 4A and 4B show how diffraction occurs in a case where the pixel pitch d=7.56 μm, the pixel inclination angle θ=12°, the illumination light Li incidence angle α=24°, and the wavelength λ=635 nm. FIG. 4A shows how diffraction occurs with the digital micromirror device 6 seen from in front, and FIG. 4B shows how diffraction occurs with the digital micromirror device 6 seen on a sectional plane perpendicular to the rotation axis of the pixel surfaces 6b. As is clear from FIG. 4A, no diffracted light of an odd-numbered order appears close to the mirror-reflected optical axis Xr, and thus the closest to the mirror-reflected optical axis Xr is the diffracted light of an even-numbered order, namely order 6 (m=6). Here, the diffracted light of order 6, which is close to, but 2.9° apart from, the mirror-reflected optical axis Xr, has 28.3% of energy; two spots of the diffracted light of order 7 are 3.4° apart from the mirror-reflected optical axis Xr and each have about 15.3% of energy; the diffracted light of order 8, which is 3.9° apart from the mirror-reflected optical axis Xr, has 8.3% of energy.

As described above, in a case where the pixel pitch d=7.56 μm, the pixel inclination angle θ=12°, and the illumination light Li incidence angle α=24°, when the wavelength λ=532 nm, reflection takes place with almost no divergence from the direction of the mirror-reflected optical axis Xr; in contrast, when the wavelength λ=635 nm, diffraction causes reflection to take place with divergence from the mirror-reflected optical axis Xr. In this way, depending on the wavelength, diffraction causes light beams with energy to travel in spread directions. To achieve image display on a screen with less unevenness in color with respect to wavelengths corresponding to red (R), green (G), and blue (B) for color display, correction needs to be performed such that illumination light having a wavelength that is diverged by diffraction is incident on the image display surface of a digital micromirror device in advance as a light beam with a small angle distribution. That is, the F-number of the light intensity distribution of a wavelength that is diverged by diffraction needs to be larger than the F-number of the light intensity distribution of a wavelength that is less influenced by diffraction.

As to the angle relationship between the mirror-reflection angle γ shown in FIG. 2 and each of red light, green light, and blue light, when, for example, the pixel pitch d=7.56 μm, the pixel inclination angle θ=12°, and the illumination light Li incidence angle α=24°, the mirror-reflection angle γ=0°. Regarding the illumination light Li, where the blue wavelength λB=445 nm, the green wavelength λG=532 nm, and the red wavelength λR=635 nm, the diffraction angles β of the wavelengths are as shown in the following Table 1 (design example 1).

TABLE 1

| Design Example 1 | 445 nm (λB) | 532 nm (λG) | 635 nm (λR) |
|---|---|---|---|
| Order 4  | −13.9° | −12.0° | −9.7° |
| Order 6  | −9.0°  | −6.2°  | −2.9° |
| Order 8  | −4.2°  | −0.5°  | 3.9°  |
| Order 10 | 0.5°   | 5.2°   | 10.8° |
| Order 12 | 5.3°   | 11.0°  | 17.8° |

As is clear from Table 1, the closest to the mirror-reflected optical axis Xr is, at the wavelength λB=445 nm, the diffracted light of order 10 with 0.5°; at the wavelength λG=532 nm, the diffracted light of order 8 with −0.5°; and at the wavelength λR=635 nm, the diffracted light of order 6 with −2.9°. Of these diffraction angles, the one with the greatest absolute value is −2.9 of the diffracted light of order 6 at the wavelength λR=635 nm. Thus, in the image projection apparatus, the angle distribution of the red illumination light with the wavelength λR=635 nm needs to be set smaller than the angle distribution of the illumination light with other wavelengths. That is, the F-number of the light intensity distribution at the wavelength λR=635 nm needs to be greater than the F-numbers of the light intensity distribution at other wavelengths.

The diffraction angle β varies depending on the illumination light Li incidence angle α, the pixel pitch d, the calculation wavelength λ, and the like. Thus, the wavelength of light to be corrected is not limited to the case of the above-described design example 1. As another design example, Table 2 (design example 2) shows the diffraction angles β at the blue wavelength λB=445 nm, at the green wavelength λG=532 nm, and at the red wavelength λR=635 nm, when the pixel pitch d=3.8 μm, the pixel inclination angle θ=12°, and the illumination light Li incidence angle α=24°.

TABLE 2

| Design Example 2 | 445 nm (λB) | 532 nm (λG) | 635 nm (λR) |
|---|---|---|---|
| Order 2  | −14.0° | −12.0° | −9.8°  |
| Order 4  | −4.3°  | −0.6°  | −3.8°  |
| Order 6  | 5.2°   | 10.8°  | 17.6°  |
| Order 8  | 14.8°  | 22.7°  | 32.6°  |
| Order 10 | 24.9°  | 35.7°  | 50.8°  |

Here, light of order 4 at the wavelength λG=532 nm is diffracted at −0.6° and thus substantially close to the regular reflection light, but at the wavelength λB=445 nm and at the wavelength λR=635 nm, light is diffracted at wider angles. Thus, in the image projection apparatus, there needs to be included at least one correction performed to reduce the angle distribution of illumination light with wavelengths other than the wavelength λG=532 nm. Here, the correction may be performed on either or both of B and R. That is, at least one of the F-numbers of the light intensity distribution at the wavelength λB=445 nm and at the wavelength λR=635 nm needs to be set larger than the F-number of the light intensity distribution at the wavelength λG=532 nm. Moreover, it is preferable to correct a color diffracted at an angle that is the farthest away from the mirror-reflected optical axis, and it is more preferable to correct colors other than a color that is diffracted at an angle that is the closest to the mirror-reflected optical axis.

As a design example with a smaller pixel pitch d, Table 3 (design example 3) shows the diffraction angles β at the blue wavelength λB=445 nm, at the green wavelength λG=532 nm, and at the red wavelength λR=635 nm, when the pixel pitch d=3.1 μm, the pixel inclination angle θ=12°, and the illumination light Li incidence angle α=24°.

TABLE 3

| Design Example 3 | 445 nm (λB) | 532 nm (λG) | 635 nm (λR) |
|---|---|---|---|
| Order 0 | −24.0° | −24.0° | −24.0° |
| Order 2 | −11.8° | −9.4°  | −6.7°  |
| Order 4 | 0.0°   | 4.5°   | 9.9°   |
| Order 6 | 11.7°  | 18.7°  | 27.5°  |
| Order 8 | 23.9°  | 34.3°  | 48.8°  |

Here, light of order 4 at the wavelength λB=445 nm (0.0°) is diffracted substantially close to the regular reflection light, but at the wavelength λG=532 nm and at the wavelength λR=635 nm, light is diffracted at wider angles. Thus, in the image projection apparatus, there needs to be included at least one correction performed to reduce the angle distribution of illumination light with wavelengths other than the wavelength λB=445 nm. Here, the correction may be performed on either or both of G and R. That is, at least one of the F-numbers of the light intensity distribution at the wavelength λG=532 nm and at the wavelength λR=635 nm needs to be set larger than the F-number of the light intensity distribution at the wavelength λB=445 nm. Moreover, it is preferable to correct a color diffracted at an angle that is the farthest away from the mirror-reflected optical axis, and it is more preferable to correct colors other than a color that is diffracted at an angle that is the closest to the mirror-reflected optical axis.

In some cases with high-definition digital micromirror devices having small pixel pitches as in the above-discussed design examples 2 and 3 (Table 2, Table 3), for example, in contrast to the illumination light with the wavelength λB that is diffracted substantially to the position of the regular reflection light, the illumination light with the wavelengths λG and λR is diffracted at wider angles. In such cases, by performing correction such that the angle distribution of either or both of the light with the wavelength λG and the light with the wavelength λR is or are reduced, it is possible to achieve optimal illumination with less unevenness of color. Moreover, it is preferable to correct a color diffracted at an angle that is the farthest away from the mirror-reflected optical axis, and it is more preferable to correct colors other than a color that is diffracted at an angle that is the closest to the mirror-reflected optical axis.

In view of the hereinabove, an image projection apparatus preferably includes a light source apparatus which emits illumination light, a digital micromirror device which modulates illumination light on an image display surface according to an image signal, a projection optical system which projects, while enlarging, an image with modulated light, and further, a corrector which, let a first wavelength and a second wavelength of wavelengths of light included in the illumination light be denoted by λ1 and λ2, respectively, the first and second wavelengths λ1 and λ2 belonging to wavelength bands of colors different from each other, let a mirror surface forming each pixel on the image display surface be referred to as a pixel surface, let reflected light produced as a result of a light ray along an illumination optical axis being mirror-reflected on the pixel surface be referred to as mirror-reflected light, let, in a comparison in traveling direction between, of diffracted light produced as a result of light rays with the wavelengths λ1 and λ2 along the illumination optical axis being diffracted on the digital micromirror device in an on state, diffracted light with the wavelength λ1 that travels in a direction closest to a traveling direction of the mirror-reflected light and diffracted light with the wavelength λ2 that travels in a direction closest to the traveling direction of the mirror-reflected light, the diffracted light with the wavelength λ1 be diffracted to a position farther away from the mirror-reflected light than the diffracted light with the wavelength λ2, corrects angle distribution of the illumination light such that the angle distribution of the illumination light includes at least an angle distribution that fulfills conditional formula (1) below:

$$F\lambda 2 < F\lambda 1 \quad (1)$$

where Fλ1 represents an F-number of illumination light with the first wavelength λ1, and Fλ2 represents an F-number of illumination light with the second wavelength λ2.

For example, by correcting the angle distribution of the illumination light with the wavelength λ1 by using the corrector such that the angle distribution of the illumination light fulfills conditional formula (1) at least at one wavelength, it is possible, before diffraction, to reduce the angle distribution of light, among light included in the illumination light, with a wavelength that is greatly affected by the diffraction. This makes it possible to achieve an image projection apparatus where the influence of diffraction at a digital micromirror device is reduced and that produces a high-quality projection image with less unevenness in color.

Moreover, as is clear from the above-described design examples 1 to 3, it is preferable that the corrector reduces a value represented by formula (2) below by correcting the angle distribution of the illumination light:

$$|\beta 1 - \gamma| - |\beta 2 - \gamma| \quad (2)$$

where

β1 represents a diffraction angle of the diffracted light with the wavelength λ1 that travels in the direction closest to the traveling direction of the mirror-reflected light;

β2 represents a diffraction angle of the diffracted light with the wavelength λ2 that travels in the direction closest to the traveling direction of the mirror-reflected light;

γ represents a mirror reflection angle formed by a normal line to the image display surface and the mirror-reflected light;

β1 and β2 are each equal to $\sin^{-1}\{m\cdot\lambda/(\sqrt{2}\cdot d) - \sin\alpha\}$;

γ is equal to $\alpha - 2\cdot\theta$;

m represents a diffraction order of diffracted light traveling in a direction closest to the traveling direction of the mirror-reflected light;

λ represents a wavelength of illumination light striking the digital micromirror device;

d represents a pixel pitch of the digital micromirror device;

α represents an incidence angle of illumination light along an illumination optical axis striking the image display surface; and θ represents an inclination angle of the pixel surface, which is an angle formed by the normal line to the image display surface and a normal line to the pixel surface.

Embodiments of Image Projection Apparatus and the Like

Figure 7:
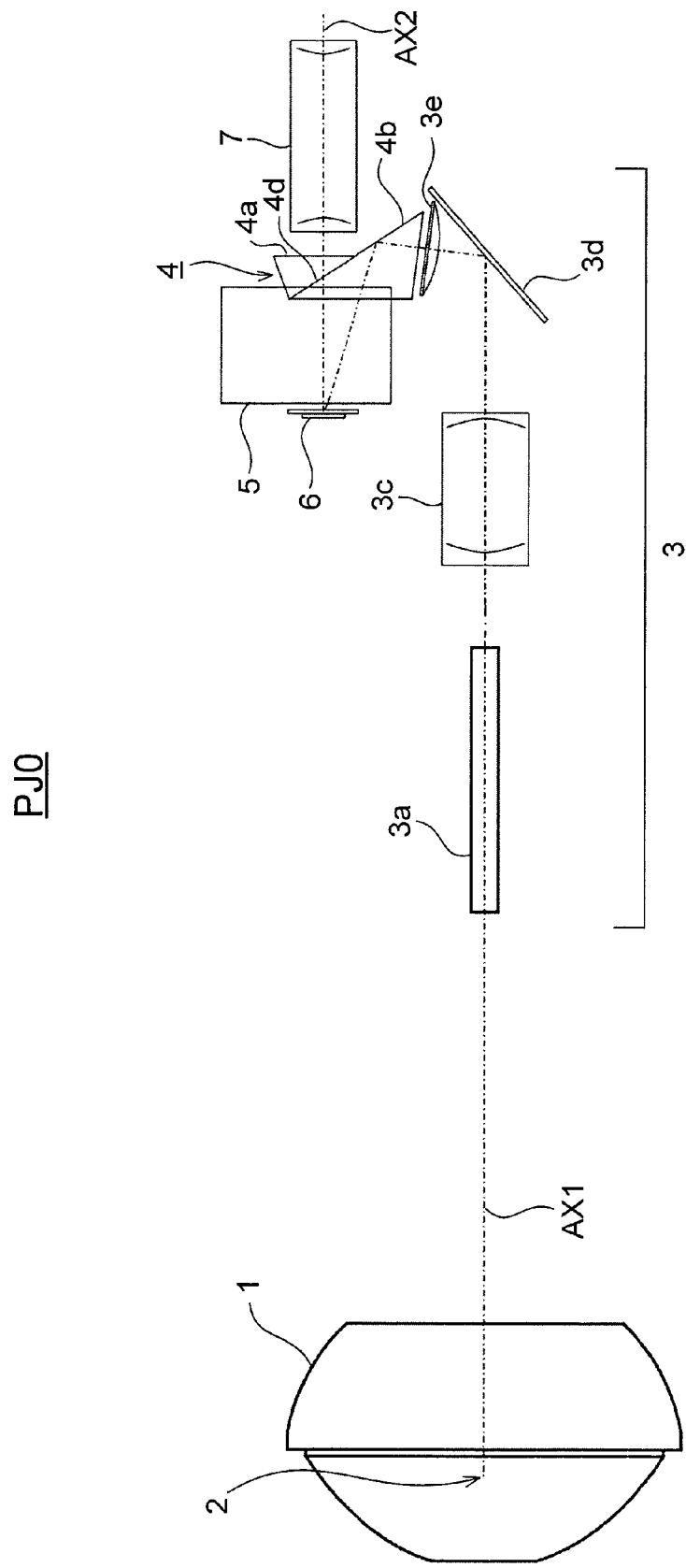
FIG. 7 is a side view showing an image projection apparatus as an example for comparison.
Figure 8:
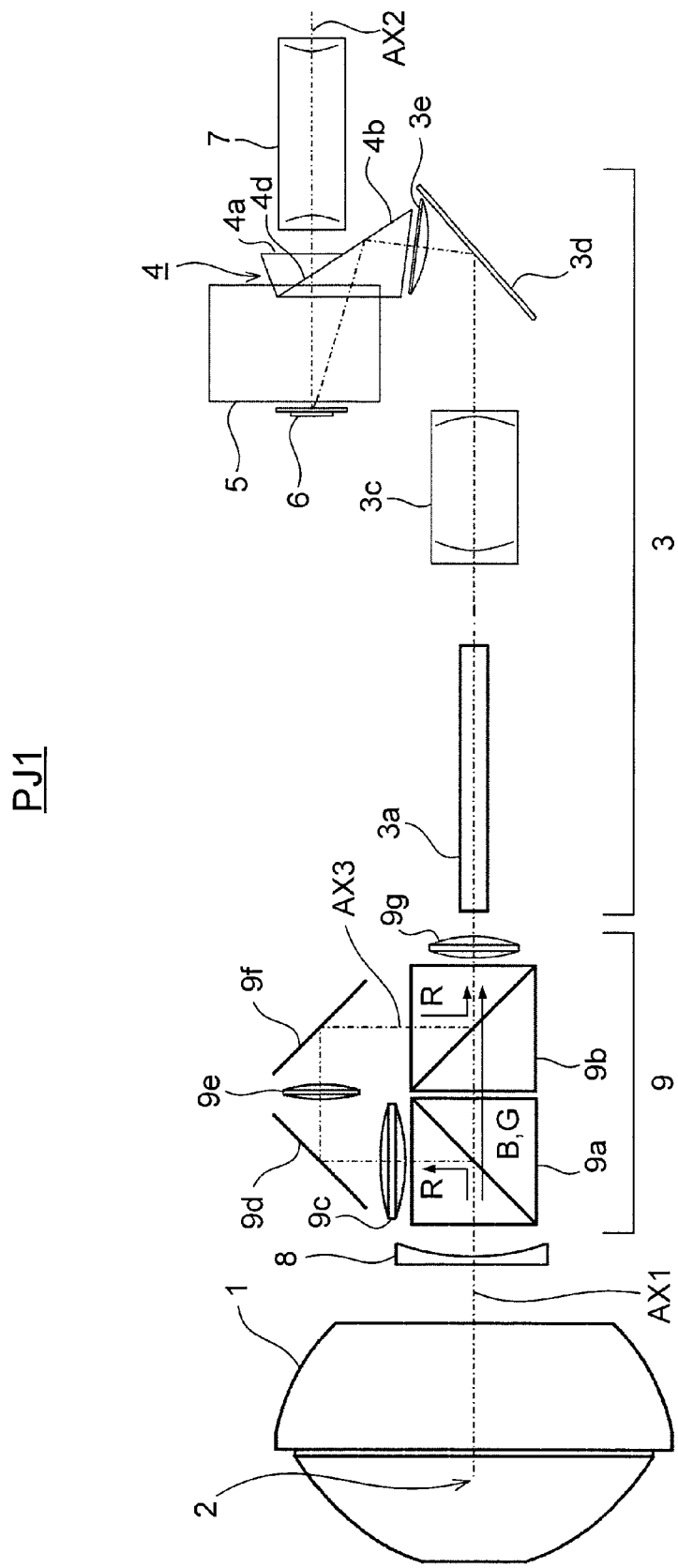
FIG. 8 is a side view showing an image projection apparatus according to a first embodiment of the present invention.

An image projection apparatus according to a first embodiment is shown in FIG. 8, and an example of an image projection apparatus is shown in FIG. 7 for comparison. The image projection apparatus PJ1 shown in FIG. 8 differs from the image projection apparatus PJ0 shown in FIG. 7 in that the image projection apparatus PJ1 is further provided with a negative lens 8 and a color separating/combining optical system 9 disposed between a lamp 1 and an illumination optical system 3; in other respects, the image projection apparatus PJ1 is similar to the image projection apparatus PJ0. That is, the image projection apparatus PJ0 includes the lamp (a light source apparatus) 1 which is a white light source, the illumination optical system 3, a TIR (Total Internal Reflection) prism unit 4, a color prism unit 5, a digital micromirror device 6, a projection optical system 7, etc. (AX1 representing an illumination optical axis and AX2 representing an projection optical axis), and the image projection apparatus PJ1 includes, in addition to these, the negative lens 8 and the color separating/combining optical system 9.

FIG. 7 and FIG. 8 show overall constructions of the image projection apparatuses PJ0 and PJ1, respectively, as seen from a direction parallel to the rotation axis of the pixels of the digital micromirror device 6. The lamp 1 is composed of a light emitting portion (light emitting point) 2, a reflector, etc. The illumination optical system 3 is composed of a rod integrator 3a, a relay optical system 3c, a deflecting mirror 3d, an entrance lens 3e, etc. The TIR prism unit 4 is composed of a first prism 4a, a second prism 4b, etc.

In the image projection apparatus PJ0 (FIG. 7), illumination light including colors R, G, and B leaves the lamp 1 in a converged state and enters the rod integrator 3a. The light that has entered the rod integrator 3a is internally reflected repeatedly to have an even light quantity distribution, and exits from the rod integrator 3a through its exit face at the other end. Past the rod integrator 3a, the relay optical system 3c is disposed. The light leaving the rod integrator 3a travels via the relay optical system 3c and the deflecting mirror 3d, and then via the entrance lens 3e disposed at the entrance side of the TIR prism unit 4, through the TIR prism unit 4, and then through the color prism unit 5, and eventually illuminates the digital micromirror device 6.

On an image display surface 6a of the digital micromirror device 6, through intensity modulation of the illumination light, a two-dimensional image is formed. The pixels of the digital micromirror device 6 have a rotation axis at 45° to each side of a rectangular image display area formed by the image display surface 6a, and rotate about the rotation axis through, for example, ±12° to display on and off (switch between on and off states). Only the light reflected on micromirrors (pixel surfaces 6b) in the on state is allowed to travel through the TIR prism unit 4, the color prism unit 5, and the projection optical system 7, so that the image displayed on the digital micromirror device 6 is projected onto a screen (not shown) on an enlarged scale.

The TIR prism unit 4 is composed of the first prism 4a and the second prism 4b, each having substantially the shape of a triangular prism, and between inclined faces of these prisms, an air gap layer 4d is provided. The TIR prism unit 4 separates input and output light to and from the digital micromirror device 6. The illumination light leaving the illumination optical system 3 enters the second prism 4b, and strikes the inclined face constituting the air gap layer 4d at an incidence angle that fulfills the total reflection condition; the light is thus totally reflected there to enter the color prism unit 5.

Figure 13:
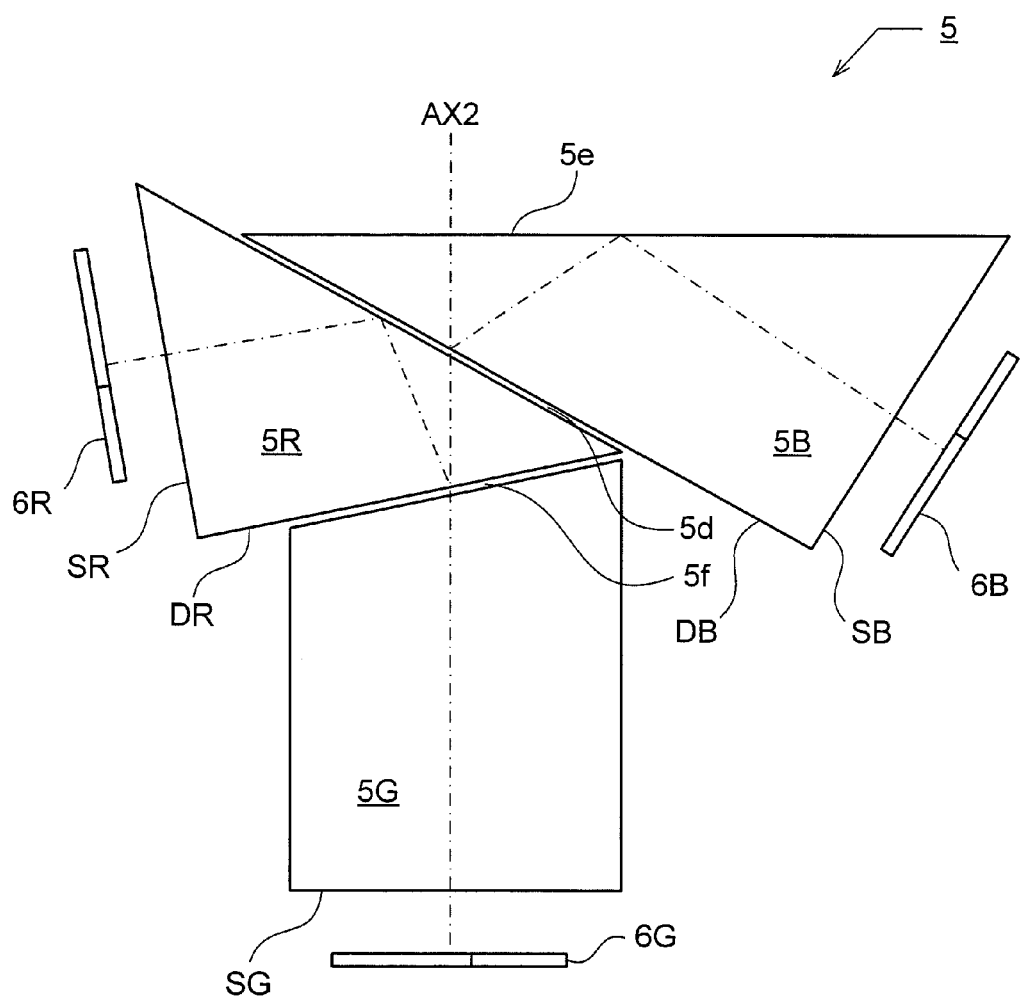
FIG. 13 is a front view showing a specific example of a color prism unit used in the image projection apparatuses shown in FIG. 7 to FIG. 11.

The illumination light is separated into three colors of red, green, and blue by the color prism unit 5. FIG. 13 shows the color prism unit 5 as seen from above its top face, which is perpendicular to the rotation axis of the pixels of the digital micromirror device 6. As shown in FIG. 13, the color prism unit 5 is composed of a blue prism 5B and a red prism 5R, each having substantially the shape of a triangular prism, and a green prism 5G having a block shape, the three prisms arranged in this order. As the digital micromirror device 6, which modulates the illumination light on the image display surface 6a according to image signals, there are provided digital micromirror devices 6R, 6G and 6B for red, green, and blue, respectively.

Between the blue prism 5B and the red prism 5R, there are provided a blue dichroic surface DB, which reflects blue light, and, contiguous to it, an air gap layer 5d. The air gap layer 5d is inclined relative to the projection optical axis AX2, and the plane including the projection optical axis AX2 and the normal line to the air gap layer 5d is perpendicular to the plane including the air gap layer 4d of the TIR prism unit 4 and the projection optical axis AX2.

Between the red prism 5R and the green prism 5G, there are provided a red dichroic surface DR, which reflects red light, and, contiguous to it, an air gap layer 5f. Here again, the air gap layer 5f is inclined relative to the projection optical axis AX2, and likewise the plane including the projection optical axis AX2 and the normal line to the air gap layer 5f is perpendicular to the plane including the normal line to the air gap layer 4d of the TIR prism unit 4 and the projection optical axis AX2. The inclination direction of the air gap layer 5f is opposite to that of the air gap layer 5d between the blue prism 5B and the red prism 5R.

Of the illumination light that has entered the blue prism 5B through its entrance/exit face 5e, the blue light is reflected on the blue dichroic surface DB while the rest, that is, the green and red light, is transmitted through it. The blue light reflected on the blue dichroic surface DB is totally reflected on the entrance/exit face 5e of the blue prism 5B, and exits from the blue prism 5B through one of its side faces, namely a blue entrance/exit face SB, to illuminate the blue digital micromirror device 6B. Of the green and red light transmitted through the blue dichroic surface DB, the red light is reflected on the red dichroic surface DR, and the green light is transmitted through it. The red light reflected on the red dichroic surface DR is totally reflected by the air gap layer 5d contiguous to the blue dichroic surface DB, and exits from the red prism 5R through one of its side faces, namely a red entrance/exit face SR, to illuminate the red digital micromirror device 6R. The green light transmitted through the red dichroic surface DR exits from the green prism 5G through one of its side faces, namely a green entrance/exit face SG, to illuminate the green digital micromirror device 6G.

The blue projection light reflected on the blue digital micromirror device 6B strikes the blue entrance/exit face SB, is totally reflected on the entrance/exit face 5e of the blue prism 5B, and is then reflected on the blue dichroic surface DB. The red projection light reflected from the red digital micromirror device 6R strikes the red entrance/exit face SR, is totally reflected on the air gap layer 5d contiguous with the blue dichroic surface DB, is then reflected on the red dichroic surface DR, and is then transmitted through the blue dichroic surface DB. The green projection light reflected on the green digital micromirror device 6G strikes the green entrance/exit face SG, and is transmitted through the red dichroic surface DR and the blue dichroic surface DB.

The red, blue, and green light are combined to have the same optical axis, exits from the blue prism 5B through its entrance/exit face 5e, and enters the TIR prism unit 4. The projection light that has entered the TIR prism unit 4 does not fulfill the total reflection condition, and is thus transmitted through the air gap layer 4d, and is projected through the projection optical system 7 onto the screen.

In the image projection apparatus PJ1 (FIG. 8), between the lamp 1 and the illumination optical system 3, there is disposed a corrector which corrects the angle distribution of the illumination light. The corrector is composed of the negative lens 8 and the color separating/combining optical system 9. The negative lens 8 is a collimator optical system which converts the illumination light from the lamp 1 into substantially parallel light. The color separating/combining optical system 9 is composed of a first dichroic prism 9a, a second dichroic prism 9b, a positive lens 9c, a deflecting mirror 9d, a positive lens 9e, a deflecting mirror 9f, and a condenser lens 9g. The first dichroic prism 9a is a color separating optical system which separates substantially parallel light into substantially parallel light with a wavelength λ1 and substantially parallel light with a wavelength λ2. The positive lenses 9c and 9e are an afocal optical system which makes the beam diameter of the substantially parallel light with the wavelength λ1 smaller than that of the substantially parallel light with the wavelength λ2. The second dichroic prism 9b is a color combining optical system which combines the substantially parallel light with the wavelength λ1 and the substantially parallel light with the wavelength λ2 along the same optical path, after the beam diameters are changed by the positive lenses 9c and 9e.

The illumination light (including R, G, and B) that has left the lamp 1 in a converged state enters the negative lens 8 to be converted into substantially parallel light, and then strikes the first dichroic prism 9a. Here, the illumination light is partly reflected by the first dichroic prism 9a, and the reflected part of the illumination light has a wavelength at which light is diffracted at the digital micromirror device 6 at a relatively large angle, and the reflected part of the illumination light is the target of correction whose angle distribution is desired to be corrected to be smaller than that of light with other wavelengths. For example, in the above-discussed design example 1 (Table 1), it is the light with the wavelength λR=635 nm, which is diffracted at the most wide-ranging angles. Thus, the R light included in the illumination light from the lamp 1 is reflected on the first dichroic prism 9a, while the other light (that is, the G and B light) is transmitted through the first dichroic prism 9a.

The light reflected on the first dichroic prism 9a is converged by the positive lens 9c, reflected by the deflecting mirror 9d, and converted by the positive lens 9e into a substantially parallel state such that its beam diameter is reduced. The substantially parallel light whose beam diameter has been reduced is reflected by the deflecting mirror 9f, and strikes the second dichroic prism 9b. On the other hand, the light that has been transmitted through the first dichroic prism 9a strikes the second dichroic prism 9b. The G and B light transmitted through the first dichroic prism 9a and the R light reflected by the first dichroic prism 9a are color-combined at the second dichroic prism 9b, to enter the condenser lens 9g. The illumination light combined along the same optical path is converged by the condenser lens 9g onto the entrance end face of the rod integrator 3a to enter the rod integrator 3a. The illumination light that has entered the rod integrator 3a, like in the image projection apparatus PJ0, passes through the optical elements to enter the projection optical system 7, to be eventually projected onto the screen as an image.

In the image projection apparatus PJ1, the beam diameters are converted such that the beam diameter of the R light is relatively smaller than those of the B and G light, and the R, G, and B light are converged by the condenser lens 9g at the same position (the entrance end face of the rod integrator 3a). As a result, the angle distribution of the illumination light varies depending on the color.

Figure 5A:
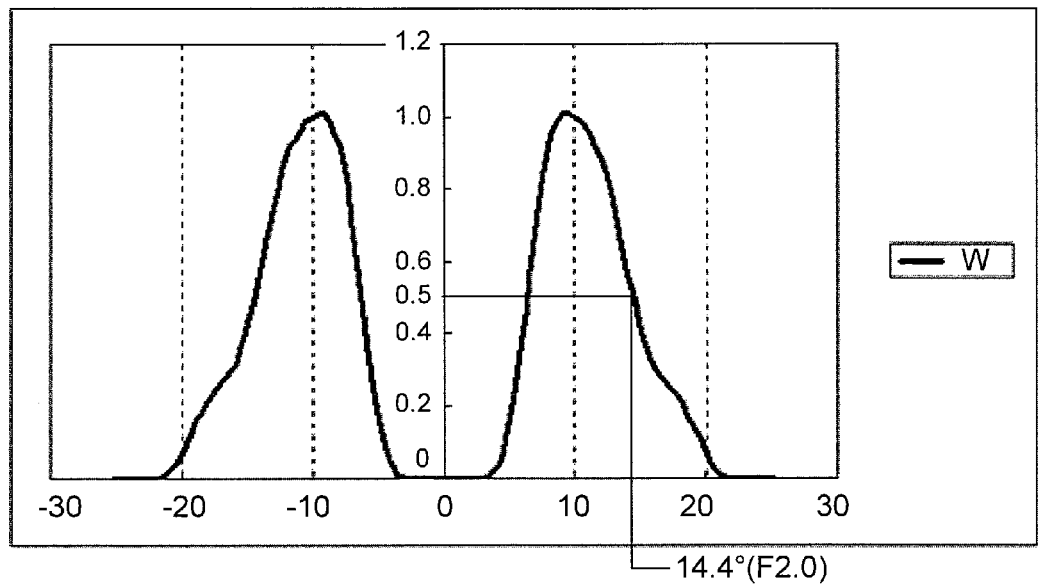
FIGS. 5A and 5B are graphs showing the light intensity angle distribution of a xenon lamp (before and after the angle distribution is corrected)
Figure 5B:
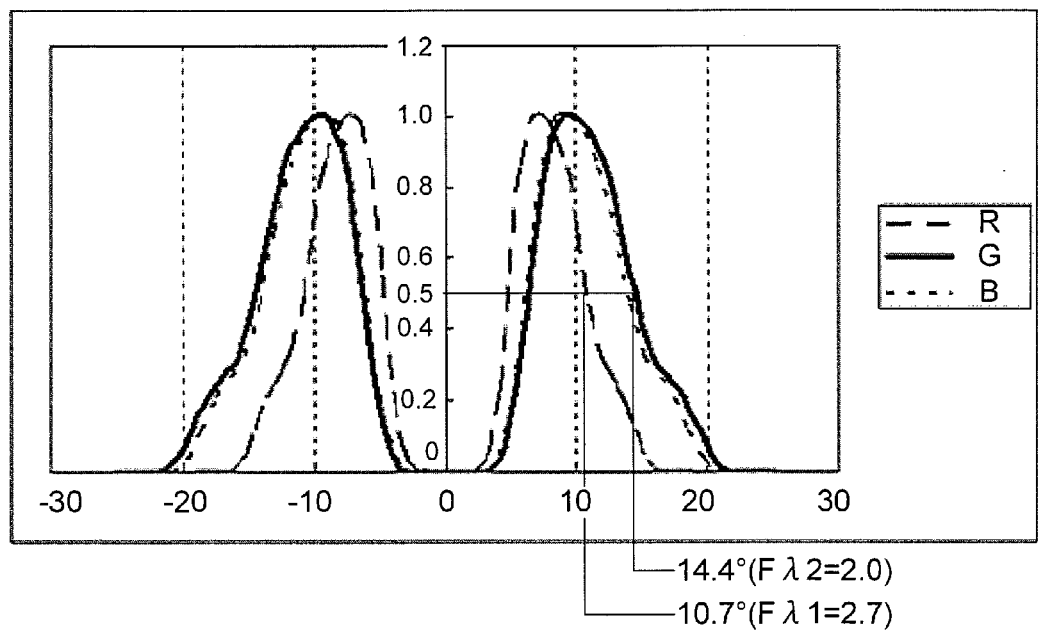

FIG. 5A shows the light intensity angle distribution of light emitted toward the illumination optical system 3 of the image projection apparatus PJ0 (FIG. 7), and FIG. 5B shows the light intensity angle distribution of light emitted toward the illumination optical system 3 of the image projection apparatus PJ1 (FIG. 8) where the design example 1 (Table 1) is adopted. Note that the lamp 1 is a xenon lamp (W representing white light) and the graphs are normalized such that the maximum light intensity is 1. Due to the construction of the lamp 1, in both the image projection apparatuses PJ0 and PJ1, the light intensity is low along and around the optical axis (the light intensity angle distribution forming a donut-like shape with a hole in the center), and in the image projection apparatus PJ0, light rays of illumination light with any wavelength are diverged at substantially the same angle, and the angle distribution at the light intensity of 50% is 14.4° (F-number=½/sin (the angle at which light rays are diverged: 14.4°) =2.0).

When the illumination light is diffracted on the digital micromirror device 6, as described above, the R light is diffracted with more diffusion than the light of the other colors, namely the G light and the B light, and thus, merely by reducing the angle distribution of the R light before striking the digital micromirror device 6, it is possible to reduce the difference in diffraction angle that differs depending on the color of light, and thus to reduce unevenness of color in an image projected on the screen. In the image projection apparatus PJ1, since the negative lens 8 and the color separating/combining optical system 9 are provided as a corrector for the purpose of reducing the unevenness in color of projected images, the angle distribution of the R light which is diffracted at a wide angle is set to be smaller than that of the G light and that of the B light. That is, the angle distribution at the light intensity of 50% is 10.7° (F$\lambda$1=½/sin (10.7°)=2.7) for the R light, and 14.4° (F$\lambda$2=½/sin (14.4°)=2.0) for the G light and the B light.

In a case where, as in the image projection apparatus PJ1, a method that uses color separation is adopted and correction is performed on two colors among R, G, and B, a color separating/combining optical system that color-separates and color-combines the three colors of R, G, and B, needs to be used instead of the first and second dichroic prisms 9a and 9b. For example, in a case where two colors of B and R are corrected in the design example 2, a cross dichroic prism that color-separates the three colors of R, G, and B from each other, an afocal optical system that makes the beam diameters of the B light and the R light smaller than the beam diameter of the G light, and a cross dichroic prism that color-combines the three colors of R, G, and B together need to be used.

Figure 9:
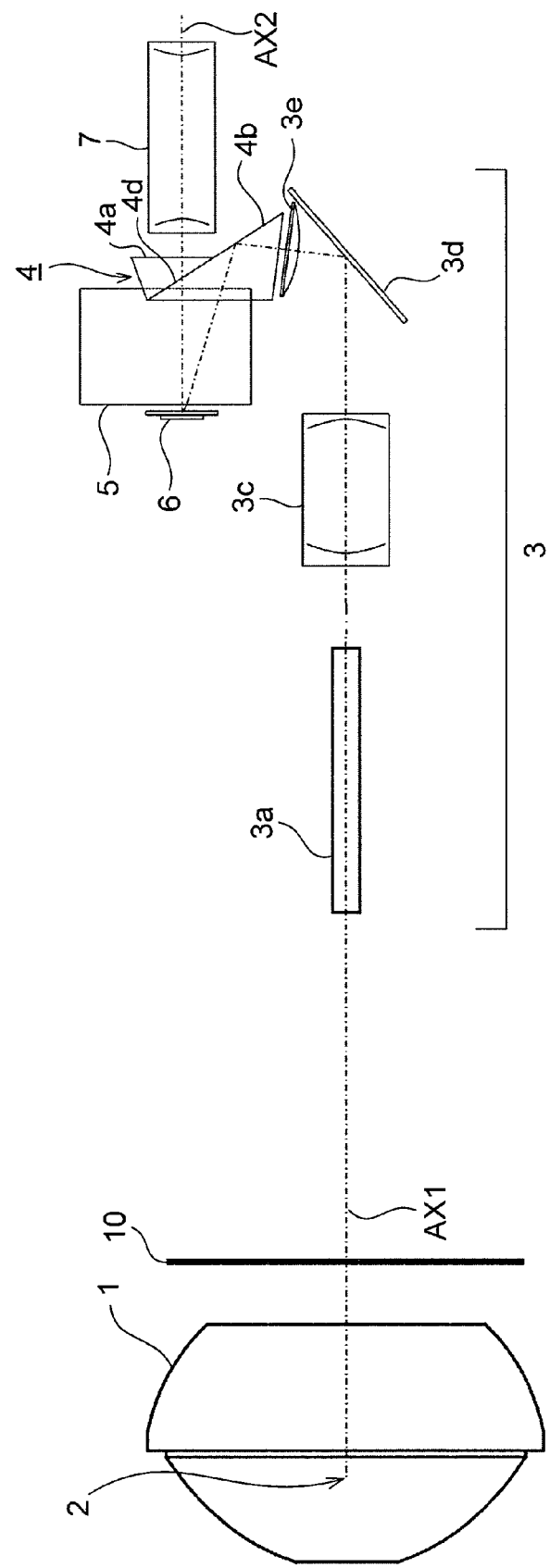
FIG. 9 is a side view showing an image projection apparatus according to a second embodiment of the present invention.
Figure 10:
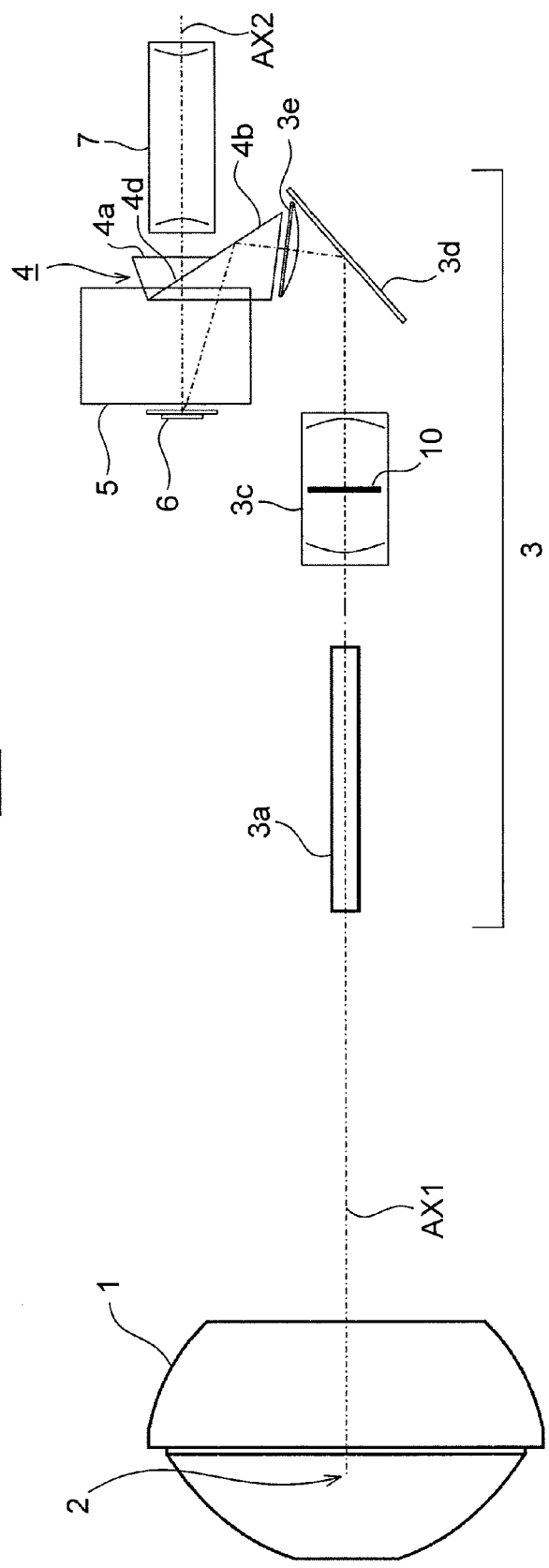
FIG. 10 is a side view showing an image projection apparatus according to a third embodiment of the present invention.

An image projection apparatus according to a second embodiment of the present invention is shown in FIG. 9, and an image projection apparatus according to a third embodiment of the present invention is shown in FIG. 10. The image projection apparatus PJ2 shown in FIG. 9 differs from the image projection apparatus PJ0 shown in FIG. 7 in that the image projection apparatus PJ2 is further provided with a filter member 10 having wavelength selectivity disposed between the lamp 1 and the illumination optical system 3; in other respects, the image projection apparatus PJ2 is similar to the image projection apparatus PJ0. The image projection apparatus PJ3 shown in FIG. 10 differs from the image projection apparatus PJ0 shown in FIG. 7 in that the image projection apparatus PJ3 is further provided with a filter member 10 having wavelength selectivity disposed inside the relay optical system 3c; in other respects, the image projection apparatus PJ3 is similar to the image projection apparatus PJ0.

Like the negative lens 8 and the color separating/combining optical system 9 used in the image projection apparatus PJ1 (FIG. 8), the filter member 10, which is used in the image projection apparatuses PJ2 and PJ3 (FIG. 9, FIG. 10), is a corrector which corrects the angle distribution of the illumination light. The filter member 10 includes at least one region therein that is formed in a ring shape and that reflects or absorbs the light with the wavelength $\lambda$1 such that the angle distribution of the light with the wavelength $\lambda$1 of the illumination light from the lamp 1 is smaller than the angle distribution of the light with the wavelength $\lambda$2 of the illumination light from the lamp 1. The filter member 10 needs to be disposed between the lamp 1 and the digital micromirror device 6, and it is preferable to disposed the filter member 10 in the vicinity of a conjugate position of the light emitting portion (light emitting point) 2. For example, it is preferable to dispose the filter member 10 at a light source conjugate position (in the vicinity of the illumination optical system stop position) inside the relay optical system 3c of the illumination optical system 3.

Figure 14:
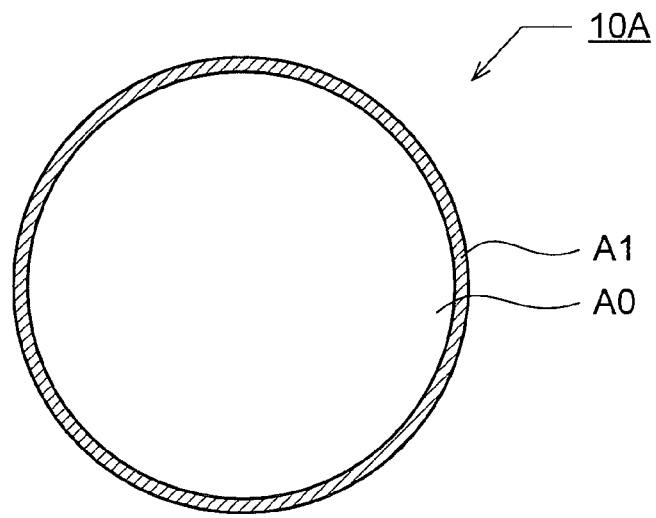
FIG. 14 is a plan view showing a specific example of a single-color-correcting filter member used in the image projection apparatuses shown in FIG. 9 and FIG. 10.

An example of the filter member 10 for single color correction is shown in FIG. 14. In a filter member 10A shown in FIG. 14, at its circumference, there is provided a multilayer film coat that reflects only the light whose angle distribution is desired to be reduced. In the case of the design example 1 (Table 1), a single-color reflecting region A1 provided in a circumference portion of the filter is formed as a multilayer film coat that reflects R light. A full transmission region A0 in a center portion of the filter may be formed as an uncoated region or as an opening (an air region). If the filter member 10A is disposed between the lamp 1 and the digital micromirror device 6, only the R light is reflected by the single-color reflecting region A1 provided in a circumference portion of the filter, and as a result, in comparison with the case where the above-described color separating/combining optical system (FIG. 8) is used, it is possible to achieve a more compact corrector, and such a compact corrector can be easily used in existing products. Instead of using a multilayer film coat that reflects only the light that has a wavelength with respect to which angle adjustment is desired to be performed, there may be used an absorbing filter that absorbs light with a desired wavelength.

Figure 15:
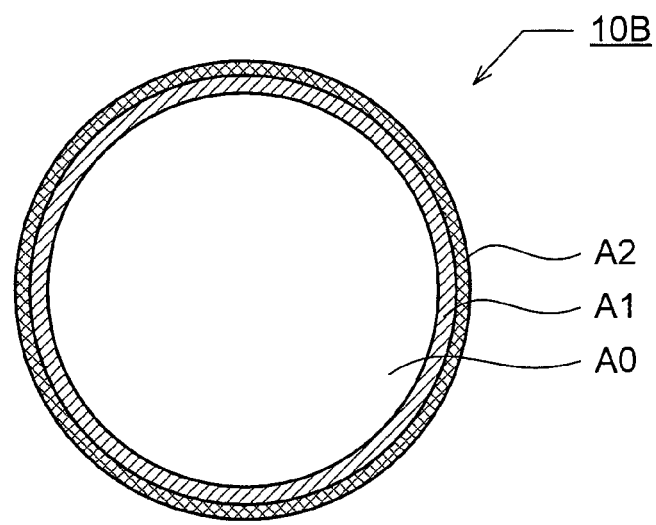
FIG. 15 is a plan view showing a specific example of a two-color-correcting filter member used in the image projection apparatuses shown in FIG. 9 and FIG. 10.

The filter member 10 (FIG. 9, FIG. 10) is not limited to one that reflects only one color as described above (FIG. 14), one which reflects two colors or three or more colors may be used as the filter member 10. A specific example of the filter member 10 for correcting two-color correction is shown in FIG. 15. In a filter member 10B shown in FIG. 15, two kinds of multilayer film coats that reflect light whose angle distribution is desired to be reduced are formed in sequence from the center to the circumference of the filter, and this makes it possible to correct the F-numbers of R, G, and B in different manners. In the case of the design example 2 (Table 2), a full transmission region A0 in a center portion of the filter is formed as an uncoated region or as an opening (an air region), a single-color reflecting region A1 in a middle portion of the filter is formed of a multilayer coat that reflects either the B light or the R light, and a two-color reflecting region A2 in a circumference portion of the filter is formed of a multilayer coat that reflects both the B light and the R light. In the case of the design example 3 (Table 3), a full transmission region A0 in a center portion of the filter is formed as an uncoated region or as an opening (an air region), a single-color reflecting region A1 in a middle portion of the filter is formed of a multilayer coat that reflects either the R light or the G light, and a two-color reflecting region A2 in a circumference portion of the filter is formed of a multilayer coat that reflects both the R light and the G light. Instead of using a multilayer film coat that reflects only the light that has a wavelength with respect to which angle adjustment is desired to be performed, there may be used an absorbing filter that absorbs light with a desired wavelength.

Figure 11:
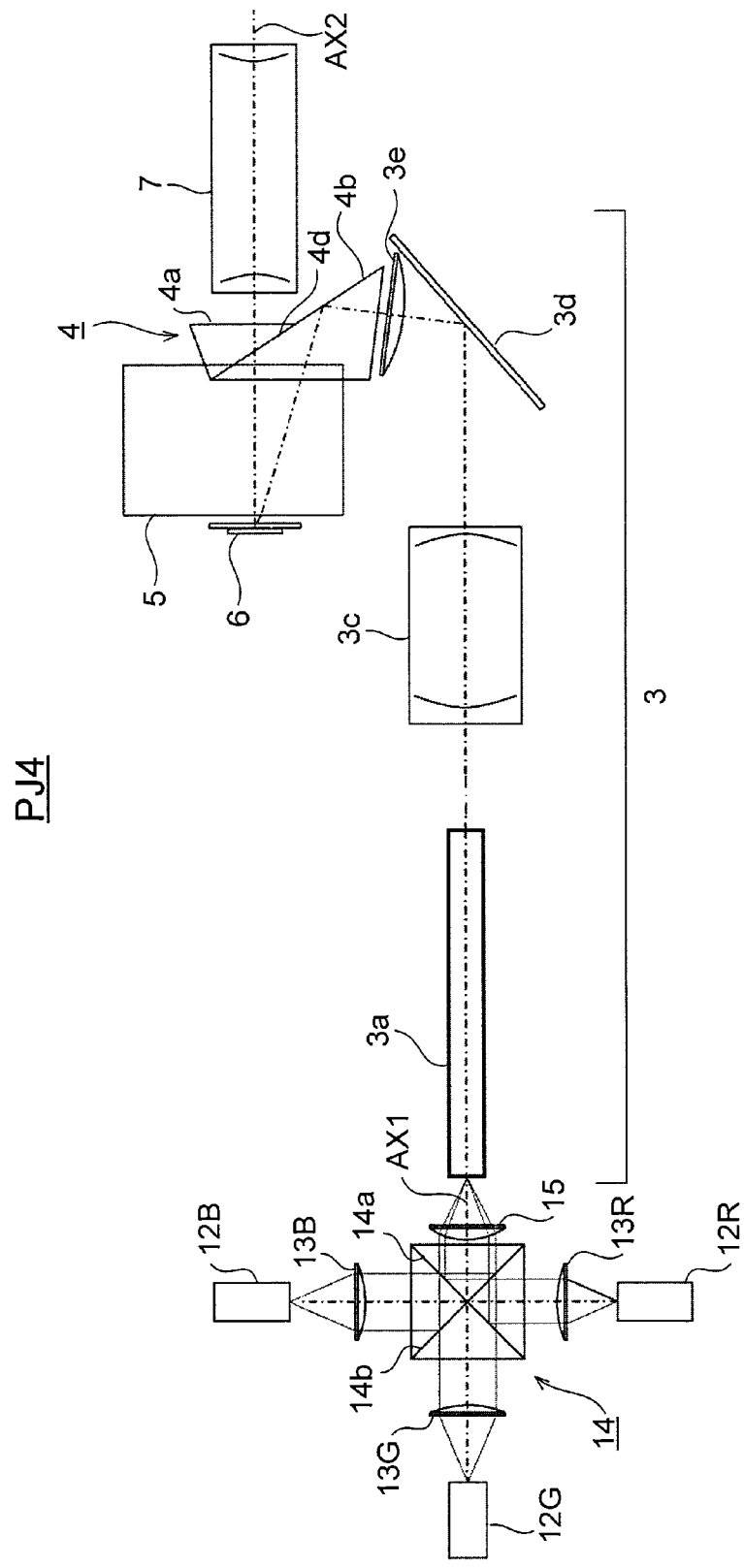
FIG. 11 is a side view showing an image projection apparatus according to a fourth embodiment of the present invention.
Figure 12:
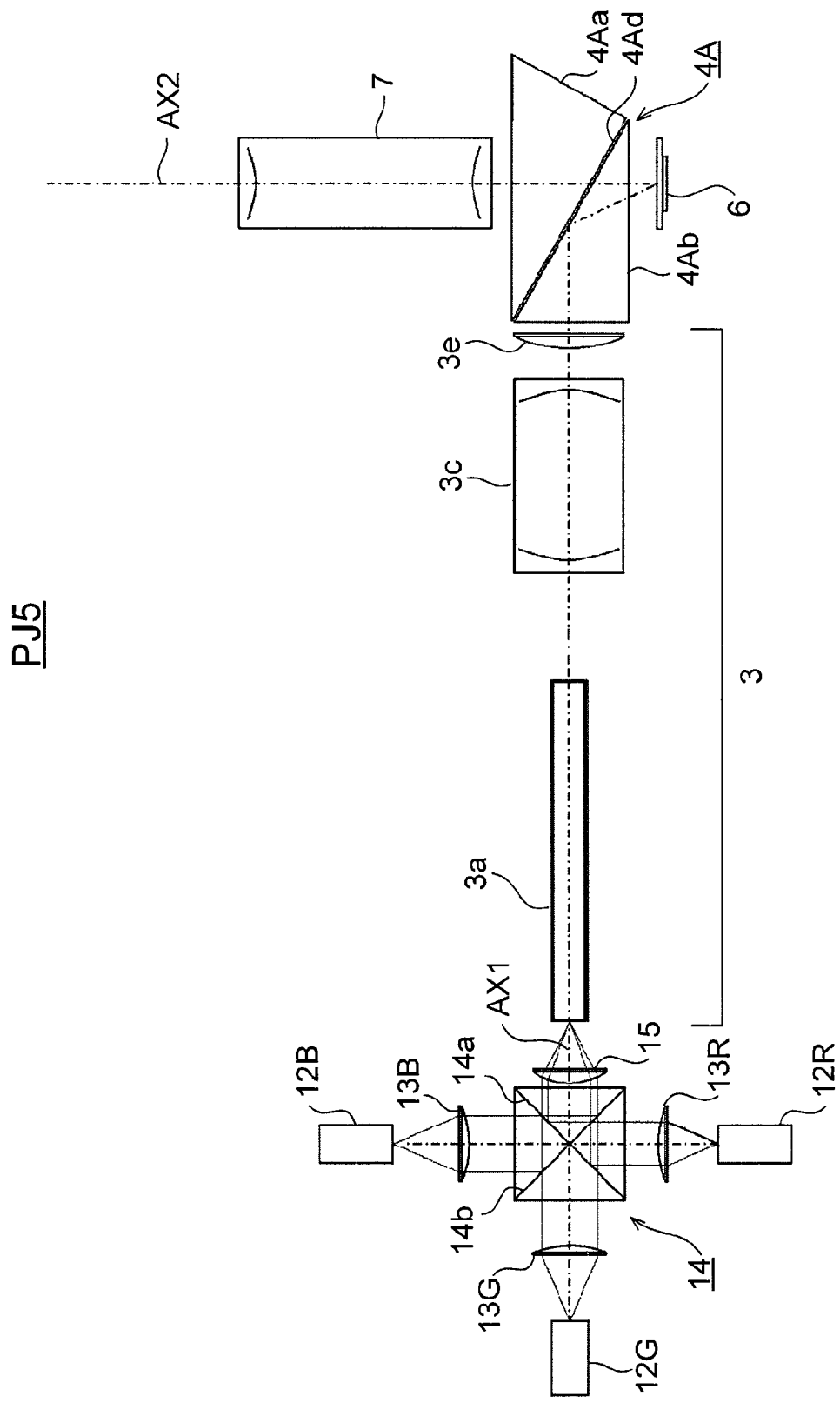
FIG. 12 is a side view showing an image projection apparatus according to a fifth embodiment of the present invention.

An image projection apparatus according to a fourth embodiment of the present invention is shown in FIG. 11, and an image projection apparatus according to a fifth embodiment of the present invention is shown in FIG. 12. The image projection apparatus PJ4 shown in FIG. 11 differs from the image projection apparatus PJ0 shown in FIG. 7 in that, instead of the lamp 1 used in the image projection apparatus PJ0, the image projection apparatus PJ4 uses single-color light sources 12R, 12G, and 12B for red, green, and blue, respectively, and the image projection apparatus PJ4 is further provided with collimator lenses 13R, 13G, and 13B, for red, green, and blue, respectively, a dichroic cross prism 14, and a condenser lens 15 disposed between the single-color light sources (12R, 12G, and 12B) and the illumination optical system 3; in other respects, the image projection apparatus PJ4 is similar to the image projection apparatus PJ0.

The image projection apparatus PJ5 shown in FIG. 12 also differs from the image projection apparatus PJ0 shown in FIG. 7 in that, instead of the lamp 1 used in the image projection apparatus PJ0, the image projection apparatus PJ5 uses the single-color light sources 12R, 12G, and 12B for red, green, and blue, respectively, having a different oscillation wavelengths from each other, and the image projection apparatus PJ5 is further provided with the collimator lenses 13R, 13G, and 13B, for red, green, and blue, respectively, the dichroic cross prism 14, and the condenser lens 15 disposed between the single-color light sources (12R, 12G, and 12B) and the illumination optical system 3; however, the image projection apparatus PJ5 adopts a single-panel design while the image projection apparatuses PJ0 to PJ4 adopt a three-panel design. In a single-panel design, no color prism unit 5 is provided, but instead, R, G, B single-color light sources 12R, 12G, and 12B emit light on a time-division basis. As the colors of light are switched sequentially, images of the corresponding colors are displayed on the digital micromirror device 6 and projected onto a screen. Switching the colors of light too quickly for the human eye to follow allows the projected images to be recognized as a color image. Moreover, the image projection apparatus PJ5 uses a TIR prism unit 4A for the single-panel design composed of first and second prisms 4Aa, 4Ab and one digital micromirror device 6, and no deflecting mirror 3d is included in the illumination optical system 3.

Like the negative lens 8 and the color separating/combining optical system 9 used in the image projection apparatus PJ1 (FIG. 8), the collimator lenses 13R, 13G, and 13B, the dichroic cross prism 14, and the condenser lens 15 used in the above-described image projection apparatuses PJ4, PJ5 (FIG. 11, FIG. 12) are a corrector which corrects the angle distribution of the illumination light. The collimator lenses 13R, 13G, and 13B are collimator optical systems, each converting the illumination light from the single-color light sources 12R, 12G, and 12B, respectively, into substantially parallel light such that the angle distribution of the illumination light with the wavelength $\lambda 1$ is smaller than the angle distribution of the illumination light with the wavelength $\lambda 2$ or other wavelengths, and the dichroic cross prism 14 is a color combining optical system which combines the substantially parallel light with the wavelength $\lambda 1$ and the substantially parallel light with the wavelength $\lambda 2$ along the same optical path.

Examples of the single-color light sources 12R, 12G, and 12B used in the image projection apparatuses PJ4 and PJ5 include semiconductor lasers and LEDs (Light Emitting Diodes). R (red), G (green), and B (blue) light emitted from the single-color light sources 12R, 12G, and 12B, respectively, are converted into substantially parallel light beams by the collimator lenses 13R, 13G, and 13B, respectively, to strike the dichroic cross prism 14. At this time, the beam diameter of each color is changed such that the beam diameter of the substantially parallel R light beam is smaller than those of the substantially parallel G and B light beams. The dichroic cross prism 14 is provided with a dichroic coat 14a which reflects the R light but transmits the B light and the G light, and a dichroic coat 14b which reflects the B light but transmits the R light and the G light. Thus, the R light, the B light, and the G light are color-combined through the dichroic cross prism 14 along the same optical path. The R light, the G light, and the B light, whose beam diameters have been relatively changed and which have been combined along the same optical path, are converged by the condenser lens 15 onto the entrance end face of the rod integrator 3a. On the condenser lens 15, the beam diameter of the R light is smaller than the beam diameters of the B light and the G light, and thus, the converging angle of the R light is smaller than the converging angles of the B light and the G light. As a result, the F-number of the R illumination light is larger than the F-numbers of the B and G illumination light.

Figure 6:
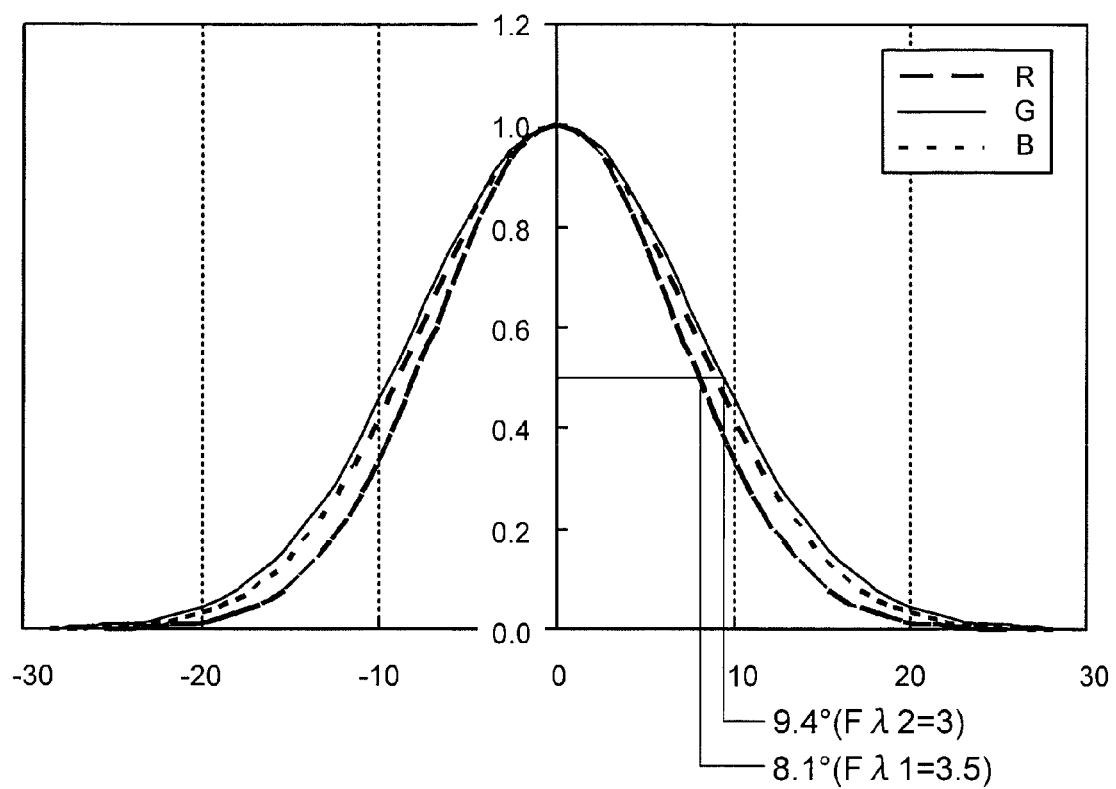
FIG. 6 is a graph showing the light intensity angle distribution (after the angle distribution is corrected) of a single-color light source.

FIG. 6 shows the light intensity angle distribution of light emitted toward the illumination optical system 3 of the image projection apparatuses PJ4 and PJ5 (FIG. 11, FIG. 12) where the design example 1 (Table 1) is adopted (however, the graphs are normalized such that the maximum light intensity is 1). In the image projection apparatuses PJ4 and PJ5, the collimator lenses 13R, 13G, and 13B and the dichroic cross prism 14 are provided as a corrector to reduce unevenness in color of projected images, and thus, the angle distribution of the R light which is diffracted at a wide angle is set to be smaller than that of the G light and that of the B light. That is, the angle distribution at the light intensity of 50% is 8.1° (F $\lambda 1=\frac{1}{2}/\sin (8.1°)=3.5$) for the R light, and 9.4° (F$\lambda 2=\frac{1}{2}/\sin (9.4°)=3.0$) for the G light and the B light. The light of each color having the angle distribution as shown in FIG. 6 is converged by the condenser lens 15 onto the entrance end face of the rod integrator 3a, to enter the rod integrator 3a. The illumination light that has entered the rod integrator 3a, as in the image projection apparatus PJ0, passes through the optical elements to enter the projection optical system 7, to be eventually projected onto the screen as an image.

In contrast to cases where a lamp light source is used, in cases where single-color light sources are used, it is possible to adjust the angle distribution on a color-by-color basis without color-separating light from the light source, which is highly efficient. Each of the single-color light sources 12R, 12G, and 12B is not limited to a single-color light source; for example, light from a plurality of single-color light sources may be shone into a fiber through one end thereof to exit therefrom through the exit end thereof at the other side as illumination light.

In cases where a plurality of single-color light sources having different oscillation wavelengths from each other are used like in the image projection apparatuses PJ4 and PJ5 (FIG. 11, FIG. 12), the angle distribution of the illumination light may be corrected by using another corrector. For example, light resulting from color-combining R, G, and B light through the dichroic cross prism 14 without correcting the angle distribution may be made to pass through the filter member 10 (FIG. 9) before being shone into the rod integrator 3a, to thereby correct the angle distribution. Or, correction of the angle distribution may be achieved by using the filter member 10 (FIG. 10) disposed inside the relay optical system 3c.

Figure 16:
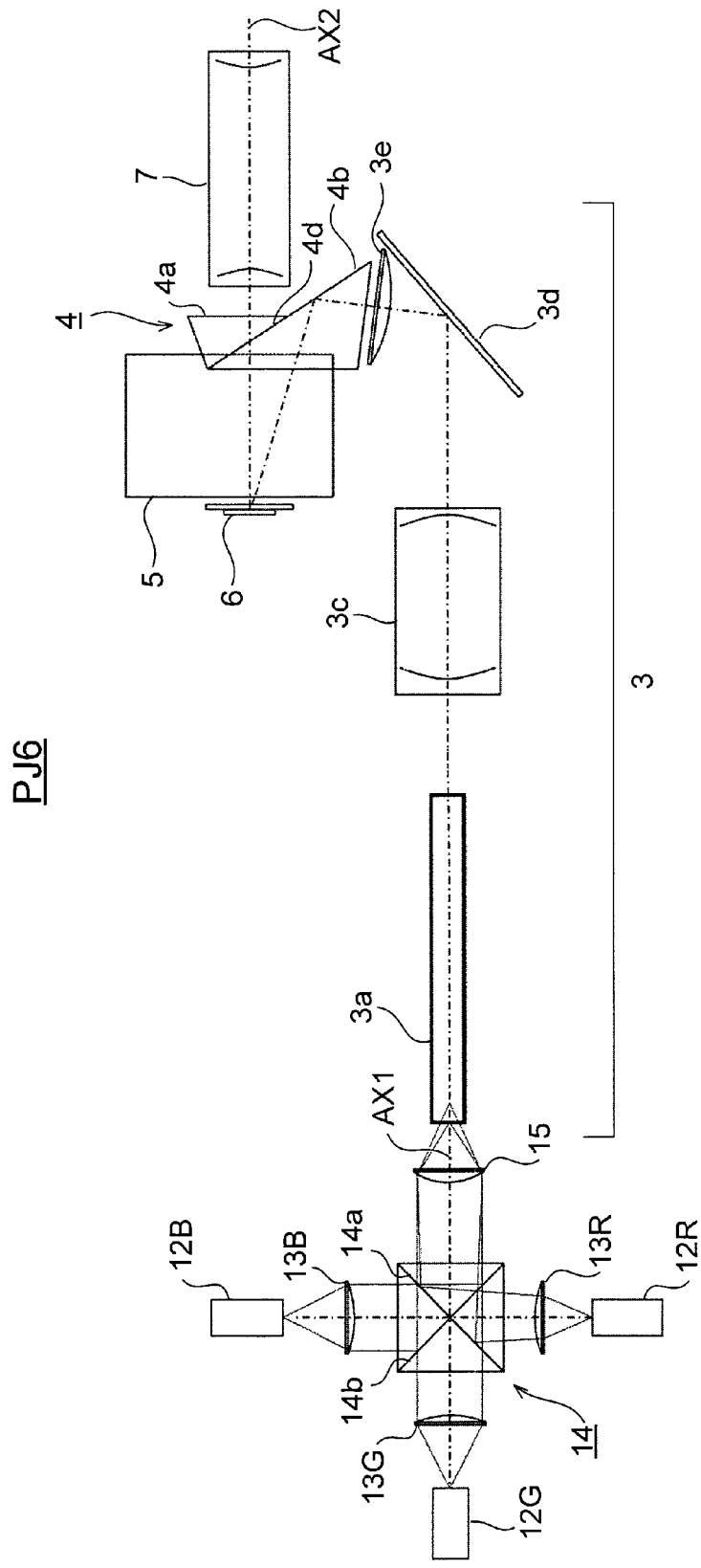
FIG. 16 is a side view showing an image projection apparatus according to a sixth embodiment of the present invention.

An image projection apparatus according to a sixth embodiment is shown in FIG. 16. The image projection apparatus PJ6 shown in FIG. 16 differs from the image projection apparatus PJ4 (FIG. 11) in how light is converted by the collimator lens 13R for red; in other respects, the image projection apparatus PJ6 is similar to the image projection apparatus PJ4. Specifically, in the R optical path, the light that has exited from the single-color light source 12R is converted by the collimator 13R into diverged light. On the condenser lens 15, the R, G, and B light have substantially the same beam diameters. As a result, the R light is converged by the condenser lens 15 to a position (inside the rod integrator 3a) that is farther away from the condenser lens 15 than a position where the B light and the G light are converged. Thus, the F-number of the R illumination light is larger than the F-numbers of the B and F illumination light. The beam diameters of the R, G, and B light do not have to be the same on the condenser lens 15; the R light may be converted into substantially parallel light and the B light and the G light may strike the condenser lens 15 in a more converged state than the R light. By changing the degree of divergence of the light striking the condenser lens 15 (the divergence here includes a case where light is converged), it is possible to change the converging angle of light directed from the condenser lens 15 to the rod integrator 3a. As a result, it is possible to give different angle distribution to illumination light of different colors.

Figure 17:
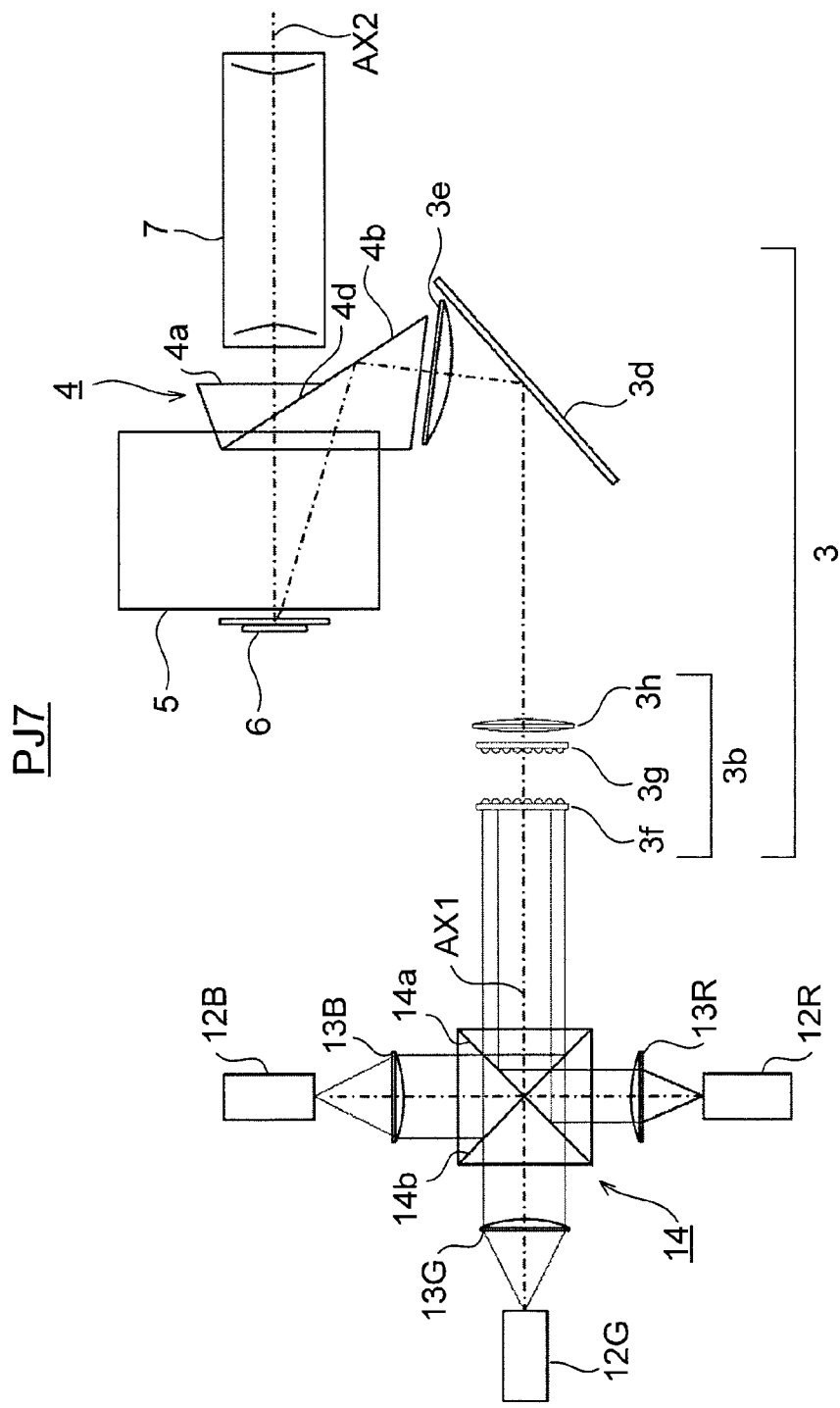
FIG. 17 is a side view showing an image projection apparatus according to a seventh embodiment of the present invention.

An image projection apparatus according to a seventh embodiment of the present invention is shown in FIG. 17. The image projection apparatus PJ7 shown in FIG. 17 differs from the image projection apparatus PJ4 (FIG. 11) in that the image projection apparatus PJ7 includes a lens array integrator 3b instead of the condenser lens 15, the rod integrator 3a, and the relay optical system 3c; in other respects, the image projection apparatus PJ7 is similar to the image projection apparatus PJ4. The lens array integrator 3b is composed of a first lens array plate 3f, a second lens array plate 3g, and a superimposing lens 3h. Here, a corrector is composed of collimator lenses 13R, 13G, and 13B and a dichroic cross prism 14.

When the R, B, and G light exit from the dichroic cross prism 14, the beam diameters of the B light and the G light are larger than the beam diameter of the R light, the beam diameters being set such that the B light and the G light also strike an outer part of the lens array that the R light does not strike. As a result, on the second lens array plate 3g as well, the beam diameters of the B light and the G light are larger than the beam diameter of the R light. Light beams exiting from each lens of the second lens array plate 3g are superimposed on each other on the digital micromirror device 6 by the superimposing lens 3h. In the lens array integrator 3b, the beam diameters on the second lens array plate 3g is related to the F-numbers of the illumination light, and thus, the F-number of the R illumination light is larger than the F-numbers of the B illumination light and the G illumination light.

In the case of the image projection apparatus PJ7 adopting the lens array integrator 3b, the above-described filter member 10 may be disposed in the optical path from between the first and second lens array plates 3f and 3g through between the entrance lens 3e and the TIR prism unit 4, to thereby correct the angle distribution. It is further preferable that the filter member 10 be disposed at a position between the vicinity of the entrance side face of the second lens array plate 3g and the vicinity of the exit face of the superimposing lens 3h.

In the fourth, fifth, sixth, and seventh embodiments of the present invention where the single-color light sources 12R, 12G, and 12B are used, the collimator lenses 13R, 13G, and 13B are used in view of simplifying the coat characteristics of the dichroic cross prism 14, but the light beams that are transmitted through the dichroic cross prism 14 are not limited to parallel light. The collimator lenses 13R, 13G, and 13B may be omitted. In the fourth, fifth, and sixth embodiments where the rod integrator 3a is used, it is possible to change the F-numbers of the illumination light by changing the converging angle of light directed from the condenser lens 15 into the rod integrator 3a. In the seventh embodiment where the lens array integrator 3b is used, it is possible to change the F-numbers of the illumination light by changing the beam diameters of light striking the lens array integrator 3b.

What is claimed is:

1. An image projection apparatus comprising:
a light source apparatus which emits illumination light;
a digital micromirror device which modulates illumination light on an image display surface according to an image signal;
a projection optical system which projects, while enlarging, an image with modulated light; and
a corrector which,
let a first wavelength and a second wavelength of wavelengths of light included in the illumination light be denoted by λ1 and λ2, respectively, the first and second wavelengths λ1 and λ2 belonging to wavelength bands of colors different from each other,
let a mirror surface forming each pixel on the image display surface be referred to as a pixel surface,
let reflected light produced as a result of a light ray along an illumination optical axis being mirror-reflected on the pixel surface be referred to as mirror-reflected light,
let, in a comparison in traveling direction between, of diffracted light produced as a result of light rays with the wavelengths λ1 and λ2 along the illumination optical axis being diffracted on the digital micromirror device in an on state, diffracted light with the wavelength λ1 that travels in a direction closest to a traveling direction of the mirror-reflected light and diffracted light with the wavelength λ2 that travels in a direction closest to the traveling direction of the mirror-reflected light, the diffracted light with the wavelength λ1 be diffracted to a position farther away from the mirror-reflected light than the diffracted light with the wavelength λ2,
corrects angle distribution of the illumination light such that the angle distribution of the illumination light includes at least an angle distribution that fulfills conditional formula (1) below:

$$F\lambda 2 < F\lambda 1 \qquad (1)$$

where Fλ1 represents an F-number of illumination light with the first wavelength λ1; and Fλ2 represents an F-number of illumination light with the second wavelength λ2.

2. The image projection apparatus according to claim 1, wherein
the corrector reduces a value represented by formula (2) below by correcting the angle distribution of the illumination light;

$$|\beta 1 - \gamma| - |\beta 2 - \gamma| \qquad (2)$$

where
β1 represents a diffraction angle of the diffracted light with the wavelength λ1 that travels in the direction closest to the traveling direction of the mirror-reflected light;
β2 represents a diffraction angle of the diffracted light with the wavelength λ2 that travels in the direction closest to the traveling direction of the mirror-reflected light;
γ represents a mirror reflection angle formed by a normal line to the image display surface and the mirror-reflected light;

β1 and β2 are each equal to $\sin^{-1}\{m \cdot /(\sqrt{2} \cdot d) - \sin \alpha\}$;

γ is equal to $\alpha - 2 \cdot \theta$;

m represents a diffraction order of diffracted light traveling in a direction closest to the traveling direction of the mirror-reflected light;

λ represents a wavelength of illumination light striking the digital micromirror device;

d represents a pixel pitch of the digital micromirror device;

α represents an incidence angle of illumination light along an illumination optical axis striking the image display surface; and θ represents an inclination angle of the pixel surface, which is an angle formed by the normal line to the image display surface and a normal line to the pixel surface.

3. The image projection apparatus according to claim 1, wherein the corrector corrects the angle distribution of the illumination light with the wavelength λ1.

4. The image projection apparatus according to claim 1, wherein the light source apparatus is composed of a plurality of single-color light sources which have different oscillation wavelengths from each other.

5. The image projection apparatus according to claim 1, further comprising an illumination optical system which includes a rod integrator, wherein the corrector is provided with a condenser lens which converges light from the light source apparatus into the rod integrator; and the condenser lens converges the light with the wavelength λ2 and the light with the wavelength λ1 which has a beam diameter that is smaller than a beam diameter of the light with the wavelength λ2 at substantially a same position.

6. The image projection apparatus according to claim 5, wherein the corrector has:

a collimator optical system which converts the illumination light from the light source apparatus into substantially parallel light;

a color separating optical system which separates the substantially parallel light into substantially parallel light with the wavelength λ1 and substantially parallel light with the wavelength λ2;

an afocal optical system which makes a beam diameter of the substantially parallel light with the wavelength λ1 smaller than a beam diameter of the substantially parallel light with the wavelength λ2; and a color combining optical system which combines the substantially parallel light with the wavelength λ1 and the substantially parallel light with the wavelength λ2, the beam diameter of at least one of the substantially parallel light with the wavelength λ1 and the substantially parallel light with the wavelength λ2 having been changed by the afocal optical system, along a same optical path to enter the condenser lens.

7. The image projection apparatus according to claim 1, wherein the corrector has a filter member which is disposed between the light source apparatus and the digital micromirror device, the filter including at least one region therein that is formed in a ring shape and that reflects or absorbs the light with the wavelength λ1 such that the angle distribution of the light with the wavelength λ1 of the illumination light from the light source apparatus is smaller than the angle distribution of the light with the wavelength λ2 of the illumination light from the light source apparatus.

8. The image projection apparatus according to claim 1, further comprising an illumination optical system which includes a rod integrator, wherein the corrector is provided with a condenser lens which converges a light beam from the light source apparatus into the rod integrator; and the condenser lens converges the light with the wavelength λ1 at a position farther away from the condenser lens than a position at which the light with the wavelength λ2 is converged.

9. The image projection apparatus according to claim 8, wherein the corrector directs the light with the wavelength λ1 and the light with the wavelength λ2 to the condenser lens such that a divergence degree of the light with the wavelength λ1 is smaller than a divergence degree of the light with the wavelength λ2.

10. The image projection apparatus according to claim 1, further comprising an illumination optical system that includes a lens array integrator, wherein the corrector directs light from the light source apparatus to the lens array integrator such that a beam diameter of the light with the wavelength λ1 is smaller than a beam diameter of the light with the second wavelength λ2.

11. The image projection apparatus according to claim 5, wherein the light source apparatus is composed of a plurality of single-color light sources which have different oscillation wavelengths from each other; and the corrector includes a color combining optical system which combines light from each of the single-color light sources.

12. The image projection apparatus according to claim 8, wherein the light source apparatus is composed of a plurality of single-color light sources which have different oscillation wavelengths from each other; and the corrector includes a color combining optical system which combines light from each of the single-color light sources.

13. The image projection apparatus according to claim 9, wherein the light source apparatus is composed of a plurality of single-color light sources which have different oscillation wavelengths from each other; and the corrector includes a color combining optical system which combines light from each of the single-color light sources.

14. The image projection apparatus according to claim 10, wherein the light source apparatus is composed of a plurality of single-color light sources which have different oscillation wavelengths from each other; and the corrector includes a color combining optical system which combines light from each of the single-color light sources.

* * * * *